US012798273B2

(12) United States Patent

Yamamoto et al.

(10) Patent No.: US 12,798,273 B2

(45) Date of Patent: Nov. 17, 2026

(54) HEAD UNIT AND LIQUID EJECTION APPARATUS

(71) Applicant: SEIKO EPSON CORPORATION, Tokyo (JP)

(72) Inventors: Hiroki Yamamoto, Shiojiri (JP); Hikaru Kumagai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 19/083,547

(22) Filed: Mar. 19, 2025

(65) Prior Publication Data

US 2025/0296373 A1 Sep. 25, 2025

(30) Foreign Application Priority Data

Mar. 21, 2024 (JP) ................................ 2024-045509

(51) Int. Cl.

| | |
|---|---|
| ***B41J 2/175*** | (2006.01) |
| ***B41J 2/14*** | (2006.01) |
| ***B41J 25/34*** | (2006.01) |
| ***B41J 29/377*** | (2006.01) |

(52) U.S. Cl.

CPC ........... *B41J 25/34* (2013.01); *B41J 2/14233* (2013.01); *B41J 2/175* (2013.01); *B41J 29/377* (2013.01); *B41J 2002/14491* (2013.01)

(58) Field of Classification Search

CPC .... B41J 2/04548; B41J 2/145; B41J 2/14233; B41J 2/175; B41J 25/34; B41J 29/02; B41J 29/13; B41J 29/377; B41J 29/38; B41J 2002/14491

See application file for complete search history.

(56) References Cited

U.S. PATENT DOCUMENTS

| | | | | |
|---|---|---|---|---|
| 2014/0216686 A1* | 8/2014 | Shelnutt | ............. | H05K 7/20318 165/96 |
| 2014/0285578 A1 | 9/2014 | Wanibe | | |
| 2015/0060009 A1* | 3/2015 | Shelnutt | ............. | H05K 7/20809 165/11.1 |

FOREIGN PATENT DOCUMENTS

| | | |
|---|---|---|
| JP | 2014-184591 A | 10/2014 |

* cited by examiner

*Primary Examiner* — Anh T Vo

(74) *Attorney, Agent, or Firm* — Spencer Fane LLP

(57) ABSTRACT

A head unit includes a connector, a fan, a tube coupling section, a liquid ejection head, a housing is provided with a first vent and a second vent, a first grip, and a second grip, wherein the connector and the first vent are provided to a first surface of the housing, the tube coupling section is provided to a second surface of the housing, the second grip is provided to the second surface of the housing, the first grip is provided to a fourth surface of the housing, the second vent is disposed at a position visible when viewed from a normal direction of the second surface, and a shortest distance between the second grip and the fourth surface is shorter than a shortest distance between the tube coupling section and the fourth surface and shorter than a shortest distance between the second vent and the fourth surface.

20 Claims, 16 Drawing Sheets

HEAD UNIT AND LIQUID EJECTION APPARATUS

The present application is based on, and claims priority from JP Application Serial Number 2024-045509, filed Mar. 21, 2024, the disclosure of which is hereby incorporated by reference herein in its entirety.

BACKGROUND

1. Technical Field

The present disclosure relates to a head unit and a liquid ejection apparatus.

2. Related Art

In a large printer such as an industrial printer, it is necessary to consider the replaceability of a head unit equipped with a print head. JP-A-2014-184591 discloses a printer in which a head unit is engaged with a slide rail and is detachably attached to a carriage in a sliding manner. JP-A-2014-184591 is an example of the related art.

However, when it is assumed that a user of the printer performs the replacement work of the head unit when a failure occurs in the head unit, it is important that the head unit heavy in weight is easily lifted to be pushed and pulled, and there is room for further improvement.

SUMMARY

An aspect of a head unit according to the present disclosure is a head unit configured to eject a liquid to a medium, the head unit including a connector to which a poAwer supply voltage propagates, a drive board including a drive signal generation circuit configured to generate a drive signal based on the power supply voltage, a fan configured to suction a gas from one of a first vent and a second vent and discharge the gas from another of the first vent and the second vent, a tube coupling section to be coupled to a tube configured to supply the liquid, a liquid ejection head including a piezoelectric element configured to eject the liquid by application of the drive signal, a housing which is configured to house the drive board and the fan and is provided with the first vent and the second vent, a first grip, and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the connector and the first vent are provided to the first surface, the tube coupling section is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the tube coupling section and the fourth surface, and shorter than a shortest distance between the second vent and the fourth surface.

Another aspect of a head unit according to the present disclosure is a head unit configured to eject a liquid to a medium, the head unit including a connector to which a power supply voltage propagates, a drive board including a drive signal generation circuit configured to generate a drive signal based on the power supply voltage, a fan configured to suction a gas from one of a first vent and a second vent and discharge the gas from another of the first vent and the second vent, a tube coupling section to be coupled to a tube configured to supply the liquid, a liquid ejection head including a piezoelectric element configured to eject the liquid by application of the drive signal, a housing which is configured to house the drive board and the fan and is provided with the first vent and the second vent, a first grip, and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the tube coupling section and the first vent are provided to the first surface, the connector is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the connector and the fourth surface, and shorter than a shortest distance between the second vent and the fourth surface.

An aspect of a liquid ejection apparatus according to the present disclosure includes the head unit.

DESCRIPTION OF EMBODIMENTS

A preferred embodiment of the present disclosure will hereinafter be described using the drawings. The drawings to be used are for the sake of convenience of explanation. Note that the embodiment described below do not unreasonably limit the content of the present disclosure set forth in the appended claims. Further, it is not necessarily true that all the configurations to be described below are essential elements of the present disclosure.

1. Overview of Liquid Ejection Apparatus

Hereinafter, the description is presented exemplifying an inkjet printer which forms an image to a medium by a carriage, on which a plurality of head units for ejecting ink as an example of a liquid is mounted, moving in one direction, and the plurality of head units ejecting the ink to the medium at rest as an example of the liquid ejection apparatus according to the present disclosure. However, the liquid ejection apparatus according to the present embodiment is not limited to this, and may be an inkjet printer of, for example, a so-called serial printing type which forms an image to a medium to be conveyed by a carriage, on which a single head unit or a plurality of head units is mounted, reciprocating, and the single head unit or the plurality of head units ejecting the ink onto the medium to be transported to form an image on the medium. Alternatively, the liquid ejection apparatus according to the present embodiment may be an inkjet printer of a so-called line printing type which forms an image on a medium to be conveyed by a plurality of head units, which are arranged to have a length no smaller than the width of the medium, ejecting the ink onto the medium.

Figure 1:
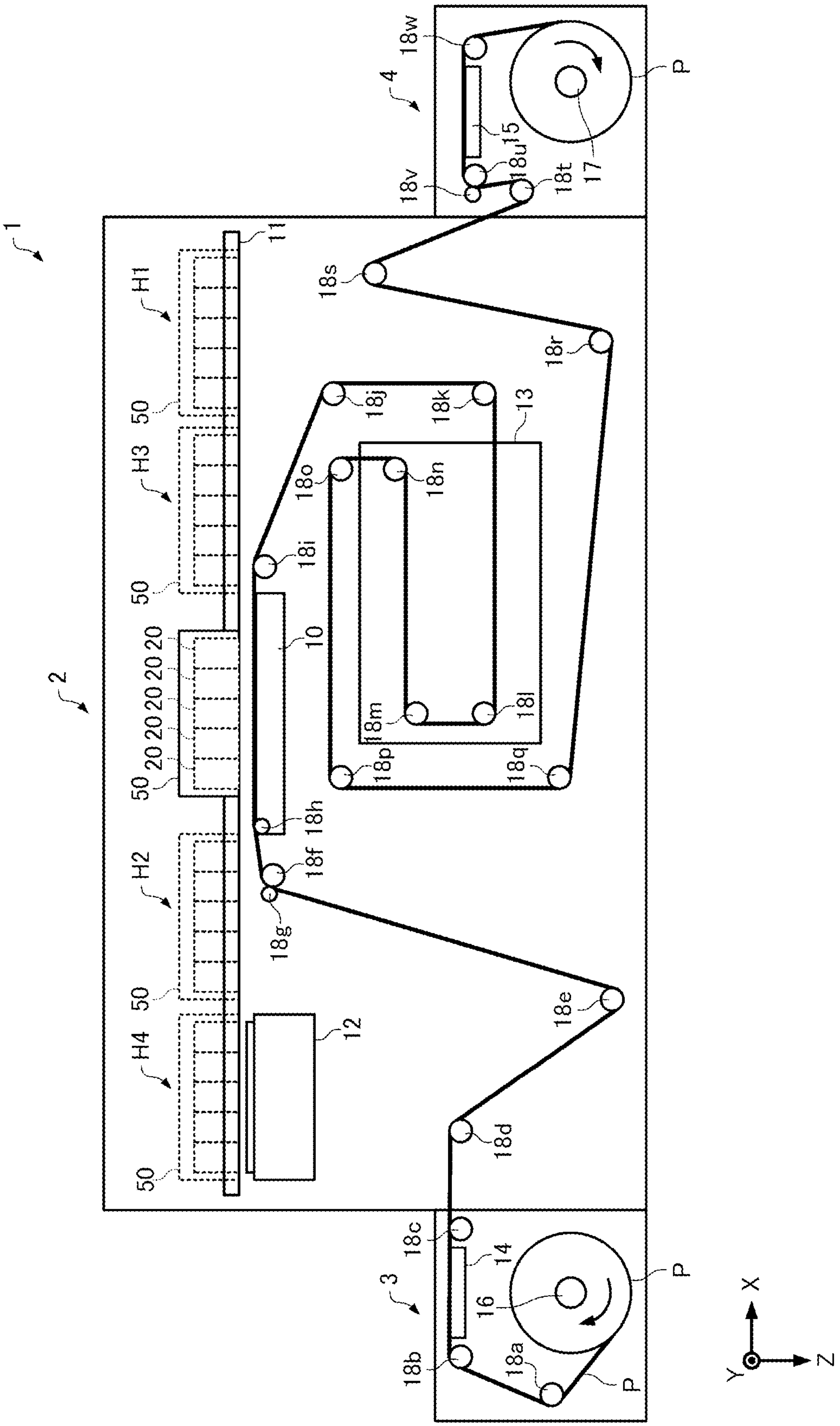
FIG. 1 is a diagram showing a schematic configuration of a liquid ejection apparatus.

First, a schematic configuration of a liquid ejection apparatus 1 according to the present embodiment will be described. FIG. 1 is a diagram illustrating a schematic configuration of the liquid ejection apparatus 1 according to the present embodiment. In the following description, the description is presented defining a direction in which a carriage 50 moves as an X direction, a direction in which the ink is ejected as a Z direction, and a direction orthogonal to the X direction and the Z direction as a Y direction. In FIG. 1, the X direction, the Y direction, and the Z direction are directions respectively represented by three arrows. Further, in some cases, a starting point side of the arrow representing the X direction may be referred to as a −X side, a tip side may be referred to as a +X side, a starting point side of the arrow representing the Y direction may be referred to as a −Y side, a tip side may be referred to as a +Y side, a starting point side of the arrow representing the Z direction may be referred to as a −Z side, and a tip side may be referred to as a +Z side. Note that the description will be presented assuming that the X direction, the Y direction, and the Z direction are directions orthogonal to each other, but the fact that a variety of constituents of the liquid ejection apparatus 1 are disposed so as to be orthogonal to each other is not a limitation. Further, as the medium P, there can be used any printing target such as printing paper, a resin film, or fabric.

As illustrated in FIG. 1, the liquid ejection apparatus 1 includes a main body unit 2 that performs print processing, a feeding unit 3 that feeds the medium P to the main body unit 2, and a winding unit 4 that winds the medium P discharged from the main body unit 2. The feeding unit 3 is disposed upstream (at the −X side) in the conveyance direction of the medium P with respect to the main body unit 2, and the winding unit 4 is disposed downstream (at the +X side) in the conveyance direction of the medium P.

In the feeding unit 3, the medium P wound to have a roll shape is rotatably supported by a winding shaft 16. The medium P fed from the roll is wound around a conveyance roller 18*a* and is conveyed to an upper surface of a feeding table 14 by a conveyance roller 18*b*. The medium P conveyed to the upper surface of the feeding table 14 is conveyed to the main body unit 2 by a conveyance roller 18*c*. Note that the feeding table 14 is used for cutting the medium P.

In the main body unit 2, the medium P is conveyed by conveyance rollers 18*d*, 18*e*, then pinched between a pair of conveyance rollers 18*f*, 18*g*, and then conveyed to an upper surface of a platen 10 by the conveyance roller 18*h*. Then, the ink is ejected from a plurality of head units 20 to the medium P conveyed to the upper surface of the platen 10, and thus an image is formed. A conveyance motor and an encoder (not shown) are coupled to the conveyance roller 18*f*.

The medium P on which the image has been formed on the upper surface of the platen 10 is conveyed to a drying chamber 13 by conveyance rollers 18*i*, 18*j*, and 18*k*. The medium P conveyed to the drying chamber 13 is conveyed inside the drying chamber 13 by conveyance rollers 18*l*, 18*m*, and 18*n*, and the medium P on which the image is formed is dried during the conveyance. Further, the medium P is discharged by a conveyance roller 180 the drying chamber 13. The medium P discharged from the drying chamber 13 is conveyed by conveyance rollers 18*p*, 18*q*, 18*r*, and 18*s* to the winding unit 4.

In the winding unit 4, the medium P is wound around a conveyance roller 18*t* and is conveyed by a pair of conveyance rollers 18*u*, 18*v* to the upper surface of the winding table 15. The medium P conveyed to the upper surface of the winding table 15 is conveyed by a conveyance roller 18*w*, and is wound up to have a roll shape by the rotational drive of a winding drive shaft 17. The winding table 15 is used for cutting the medium P.

As shown in FIG. 1, the plurality of head units 20 is mounted on the carriage 50. The carriage 50 moves while being guided by a guide shaft 11 extending in the X direction due to an operation of a carriage motor (not shown). In FIG. 1, H1 is an initial position of the carriage 50. When the print processing is instructed, the carriage 50 moves from the position H1 to a position H2 and further moves from the position H2 to a position H3. While the carriage 50 moves from the position H2 to the position H3, the medium P as much as the length of one page is conveyed to the platen 10. Then, after the conveyance of the medium P stops, the carriage 50 moves from the position H3 to the position H2 and then stops. During a period in which the carriage 50 moves from the position H3 to the position H2, the ink is ejected from the plurality of head units 20, and an image is formed on the medium P located on the platen 10. The width in the Y direction of the plurality of head units 20 is substantially equal to the width in the Y direction of the medium P, and the image corresponding to the one page is formed on the medium P while the carriage 50 moves once from the position H3 to the position H2.

At a position H4, a lower surface of the carriage 50 is opposed to a maintenance unit 12. The maintenance unit 12 has a configuration including, for example, a cap member and a wiping member provided so as to correspond to each of the head units 20, and a suction device which is coupled to the cap member to suck the inside of the cap member. That is, when the carriage 50 is located at the position H1, automatic maintenance of the head units 20 is performed. In contrast, when the carriage 50 is located at the position H1, manual maintenance on the head units 20 can be performed. For example, the operator can perform wiping of a nozzle formation surface of the head unit 20, a replacement work of the head unit 20, and so on.

2. Functional Configuration of Liquid Ejection Apparatus

Figure 2:
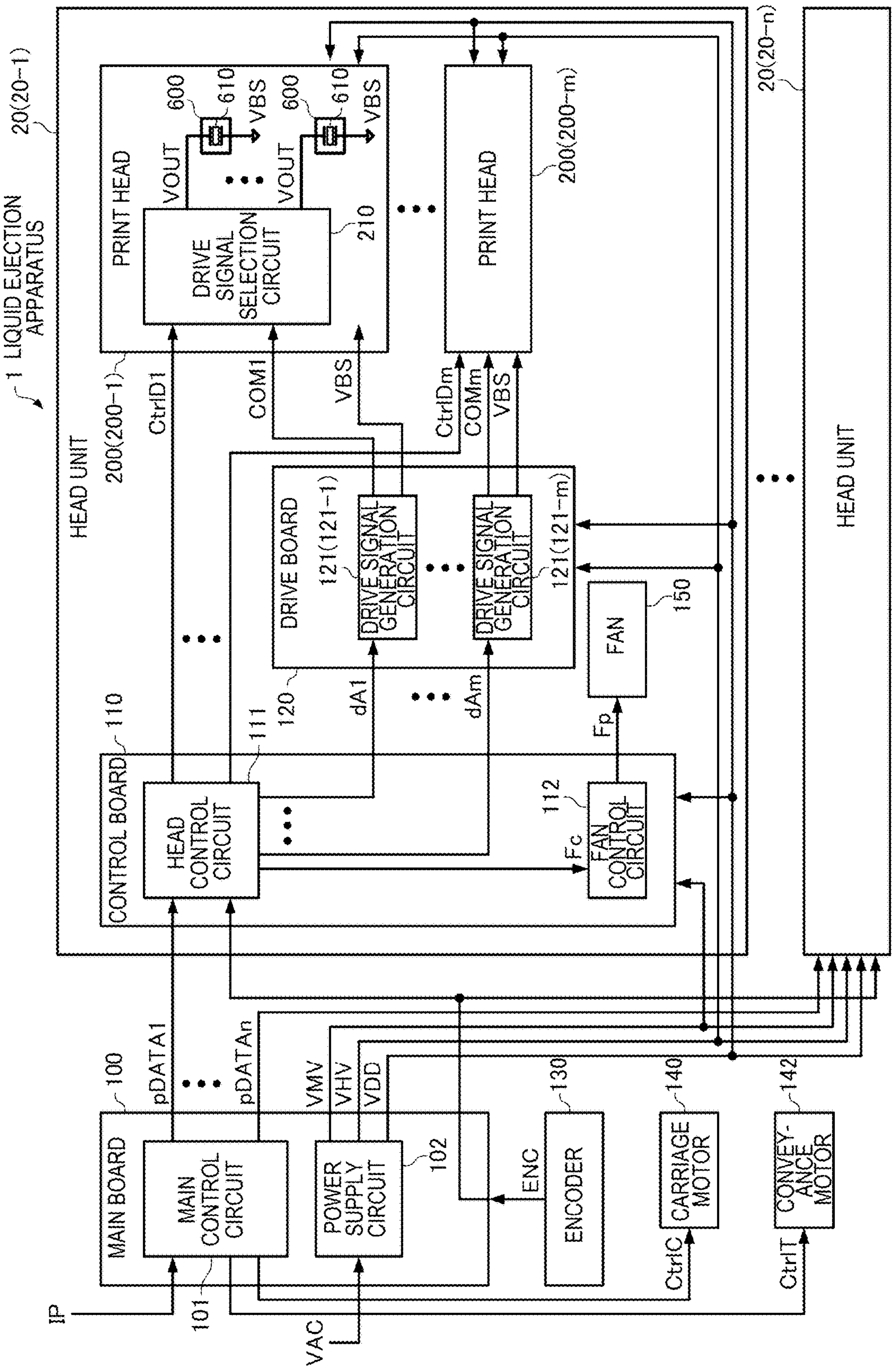
FIG. 2 is a diagram showing an example of a functional configuration of the liquid ejection apparatus.

Then, a functional configuration of the liquid ejection apparatus 1 will be described. FIG. 2 is a diagram showing an example of the functional configuration of the liquid ejection apparatus 1. As shown in FIG. 2, the liquid ejection apparatus 1 includes a main board 100 and n head units 20. The character n is an integer no smaller than 1. Here, although the n head units 20 have substantially the same configurations, the n head units 20 may be referred to as head units 20-1 to 20-*n* in some cases when the n head units 20 are distinctly described. Further, the liquid ejection apparatus 1 includes an encoder 130, a carriage motor 140, and a conveyance motor 142. Although not shown in FIG. 1, the main board 100, the encoder 130, the carriage motor 140, and the conveyance motor 142 are provided to the main body unit 2.

As shown in FIG. 2, the main board 100 is provided with a main control circuit 101 and a power supply circuit 102.

Image data IP is input to the main control circuit 101 from a host computer (not shown). The main control circuit 101 generates print data pDATA1 to pDATAn of the respective head units 20-1 to 20-*n* based on the image data IP, and outputs the print data pDATA1 to pDATAn to the head units 20-1 to 20-*n*, respectively. Hereinafter, when the head units 20-1 to 20-*n* are referred to as the head units 20 without distinction, the print data pDATA1 to pDATAn are referred to as print data pDATA without distinction.

Further, The main control circuit 101 generates a control signal CtrlC for controlling the movement of the carriage 50, and outputs the control signal CtrlC to the carriage motor 140. The carriage motor 140 operates in accordance with the control signal CtrlC, and the movement of the carriage 50 is controlled by the carriage motor 140. Further, the main control circuit 101 generates a control signal CtrlT for controlling the conveyance of the medium P, and outputs the control signal CtrlT to the conveyance motor 142. The conveyance motor 142 operates in accordance with the control signal CtrlT, and at least a part of the conveyance rollers 18*a* to 18*v* is rotated or stopped by the conveyance motor 142, and thus, the conveyance of the medium P is controlled. Note that the control signal CtrlC may be input to the carriage motor 140 after being subjected to a signal conversion via a driver circuit (not shown), and the control signal CtrlT may similarly be input to the conveyance motor 142 after being subjected to a signal conversion via a driver circuit (not shown).

The power supply circuit 102 generates, from a commercial voltage VAC input from the outside of the liquid ejection apparatus 1, a power supply voltage VHV having a voltage value of, for example, 42V, a power supply voltage VMV having a voltage value of, for example, 24V, and a power supply voltage VDD having a voltage value of, for example, 3.3V, and outputs the power supply voltages to the head units 20-1 to 20-*n* in common. Note that the voltage value of the power supply voltage VHV, the voltage value of the power supply voltage VMV, and the voltage value of the power supply voltage VDD are not limited to 42V, 24V, and 3.3V, respectively.

A detection signal ENC of the encoder 130 is output to the head units 20-1 to 20-*n* in common via the main board 100. The detection signal ENC of the encoder 130 is used for identifying a position in the head units 20-1 to 20-*n*.

The head unit 20 includes a control board 110, a drive board 120, a fan 150, and m print heads 200. The character m is an integer no smaller than 1. Here, although the m print heads 200 have substantially the same configurations, when the m print heads 200 are distinctly described, the m print heads 200 may be referred to as print heads 200-1 to 200-*m* in some cases.

The control board 110 is provided with a head control circuit 111 and a fan control circuit 112. The control board 110 is supplied with the power supply voltages VDD, VMV, the head control circuit 111 operates based on the power supply voltage VDD, and the fan control circuit 112 operates based on the power supply voltages VDD, VMV.

The drive board 120 is provided with m drive signal generation circuits 121. The drive board 120 is supplied with the power supply voltages VDD, VHV, and the m drive signal generation circuits 121 operate based on the power supply voltages VDD, VHV. Here, although the m drive signal generation circuits 121 have substantially the same configurations, the m drive signal generation circuits 121 may be referred to as drive signal generation circuits 121-1 to 121-*m* in some cases when the m drive signal generation circuits 121 are distinctly described.

The print data pDATA and the detection signal ENC of the encoder 130 are input to the head control circuit 111. The head control circuit 111 figures out scanning positions of the respective print heads 200-1 to 200-*m* based on the detection signal ENC of the encoder 130. Further, the head control circuit 111 generates various control signals CtrlD1 to CtrlDm corresponding to the scanning positions of the print heads 200-1 to 200-*m* based on the print data pDATA and the scanning positions, and outputs the control signals CtrlD1 to CtrlDm to the print heads 200-1 to 200-*m*, respectively. Hereinafter, when the print heads 200-1 to 200-*m* are referred to as the print heads 200 without distinction, the control signals CtrlD1 to CtrlDm are also referred to as control signals CtrlD without distinction.

Further, the head control circuit 111 generates base drive signals dA1 to dAm for controlling the operation of the print heads 200-1 to 200-*m*, and outputs the base drive signals dA1 to dAm to the drive signal generation circuits 121-1 to 121-*m*, respectively. The base drive signals dA are digital signals including information defining signal waveforms of drive signals COM for driving piezoelectric elements 610 described later. Hereinafter, when the drive signal generation circuits 121-1 to 121-*m* are referred to as the drive signal generation circuits 121 without distinction, the base drive signals dA1 to dAm are also referred to as the base drive signals dA without distinction.

Further, the head control circuit 111 generates a control signal Fc for controlling the operation of the fan control circuit 112, and outputs the control signal Fc to the fan control circuit 112.

The fan control circuit 112 generates a control signal Fp based on the power supply voltage VMV and the control signal Fc, and outputs the control signal Fp to the fan 150.

The operation of the fan 150 is controlled by the control signal Fp. The fan 150 is disposed inside the head unit 20, and generates an airflow inside the head unit 20. The control board 110 and the drive board 120 are cooled by the airflow generated by the fan 150.

The drive signal generation circuits 121-1 to 121-*m* respectively convert the base drive signals dA1 to dAm into analog signals, and then, amplify the analog signal thus converted to thereby generate drive signals COM1 to COMm, respectively, and output the drive signals COM1 to COMm to the print heads 200-1 to 200*m*, respectively. That is, the base drive signals dA1 to dAm are digital signals including information defining the signal waveforms of the drive signals COM1 to COMm, respectively. Further, the drive signal generation circuits 121-1 to 121-*m* generate reference voltage signals VBS, and output the reference voltage signals VBS to the print heads 200-1 to 200*m*, respectively. The reference voltage signal VBS may be, for example, a ground potential having a voltage value of 0V or may be a DC voltage having a voltage value such as 5.5V or 6V.

The print head 200 operates based on the power supply voltages VDD, VHV. The print head 200 has a drive signal selection circuit 210 and a plurality of ejection units 600 including piezoelectric elements 610. The drive signal selection circuit 210 selects or deselects the signal waveforms provided to the drive signals COM based on the control signals CtrlD to thereby output drive signals VOUT corresponding to the plurality of ejection units 600, respectively. That is, when the print head 200 includes p ejection units 600, the drive signal selection circuit 210 generates p drive signals VOUT corresponding respectively to the p ejection units 600 and outputs the drive signals VOUT to the corresponding ejection units 600. As described above, the print heads 200-1 to 200-*m* select or deselect the signal waveforms provided to the drive signals COM1 to COMm based on the control signals CtrlD1 to CtrlDm, respectively, to thereby output the drive signals VOUT corresponding to the respective ejection units 600.

Each of the ejection units 600 includes the piezoelectric element 610. The drive signal VOUT corresponding to the piezoelectric element 610 is supplied to one end of the piezoelectric element 610. Further, the reference voltage signal VBS is commonly supplied to the other ends of the piezoelectric elements 610. Further, the piezoelectric element 610 is displaced due to a potential difference between the drive signal VOUT and the reference voltage signal VBS. A corresponding amount of ink to the displacement of the piezoelectric element 610 is ejected from the ejection unit 600 corresponding to the piezoelectric element 610. Then, when the ink ejected from the ejection unit 600 lands on the medium P, an image is formed on the medium P.

Figure 3:
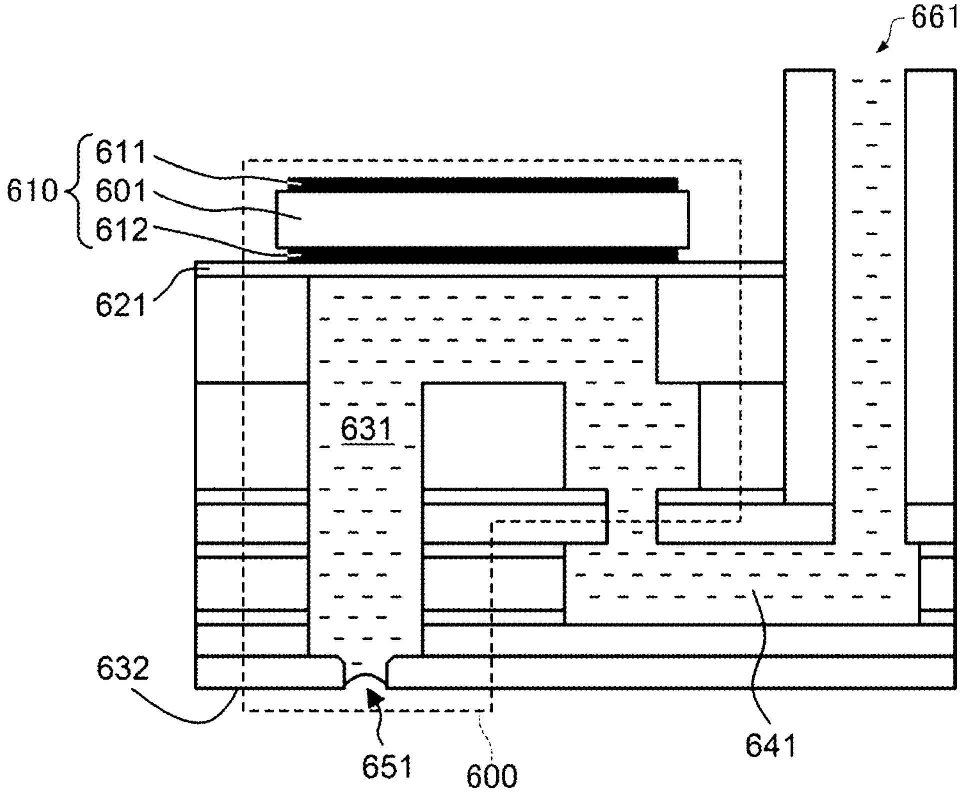
FIG. 3 is a diagram illustrating a schematic configuration of an ejection unit.

FIG. 3 is a diagram illustrating an example of a configuration of the ejection unit 600. FIG. 3 illustrates a nozzle plate 632, a reservoir 641, and a supply port 661 in addition to the ejection unit 600.

As illustrated in FIG. 3, the ejection unit 600 includes the piezoelectric element 610, a vibration plate 621, a cavity 631, and a nozzle 651. The piezoelectric element 610 includes a piezoelectric body 601 and electrodes 611 and 612. The piezoelectric element 610 is formed by the electrode 611, 612 being located across the piezoelectric body 601. Such a piezoelectric element 610 is driven so that a central portion is displaced in a vertical direction in accordance with a potential difference between a voltage supplied to the electrode 611 and a voltage supplied to the electrode 612. Specifically, the drive signal VOUT based on the drive signal COM is supplied to the electrode 611, and the reference voltage signal VBS is supplied to the electrode 612. Further, when the voltage value of the drive signal VOUT to be supplied to the electrode 611 changes, the potential difference between the drive signal VOUT supplied to the electrode 611 and the reference voltage signal VBS supplied to the electrode 612 changes, and the piezoelectric element 610 is driven so that a central portion is displaced in a vertical direction.

The vibration plate 621 is located below the piezoelectric element 610 in FIG. 3. In other words, the piezoelectric element 610 is formed on a surface of the vibration plate 621, the surface being located at an upper side in FIG. 3. Such a vibration plate 621 is displaced in the vertical direction due to the drive of the piezoelectric element 610 in the vertical direction.

The cavity 631 is located at a lower side of the vibration plate 621 in FIG. 3. The ink is supplied to the cavity 631 from the reservoir 641. Further, the ink stored in a liquid container (not shown) is introduced into the reservoir 641 via the supply port 661. That is, the inside of the cavity 631 is filled with the ink stored in the liquid container. The internal volume of such a cavity 631 expands or contracts due to the displacement in the vertical direction of the vibration plate 621. That is, the vibration plate 621 functions as a diaphragm that changes the internal volume of the cavity 631, and the cavity 631 functions as a pressure chamber the internal pressure of which changes due to the displacement in the vertical direction of the vibration plate 621.

The nozzle 651 is an opening provided to the nozzle plate 632 and communicates with the cavity 631. When the internal volume of the cavity 631 changes, the ink that fills the inside of the cavity 631 is ejected from the nozzle 651 in accordance with the change in the internal volume.

In the ejection unit 600 configured as described above, when the piezoelectric element 610 is driven to bend upward, the vibration plate 621 is displaced upward. Thus, the internal volume of the cavity 631 expands, and as a result, the ink stored in the reservoir 641 is drawn into the cavity 631. On the other hand, when the piezoelectric element 610 is driven to bend downward, the vibration plate 621 is displaced downward. Thus, the internal volume of the cavity 631 contracts, and as a result, a corresponding amount of ink to the degree of the contraction of the internal volume of the cavity 631 is ejected from the nozzle 651. That is, a corresponding amount of ink to the voltage value of the drive signal VOUT is ejected from each of the plurality of ejection units 600.

It should be noted that the structure of the piezoelectric element 610 is not limited to the structure shown in FIG. 3 as long as the piezoelectric element 610 is driven by being supplied with the drive signal VOUT corresponding to the drive signal COM, and can eject the ink from the nozzle 651 by being driven in that structure.

3. Structure of Head Unit

Figure 4:
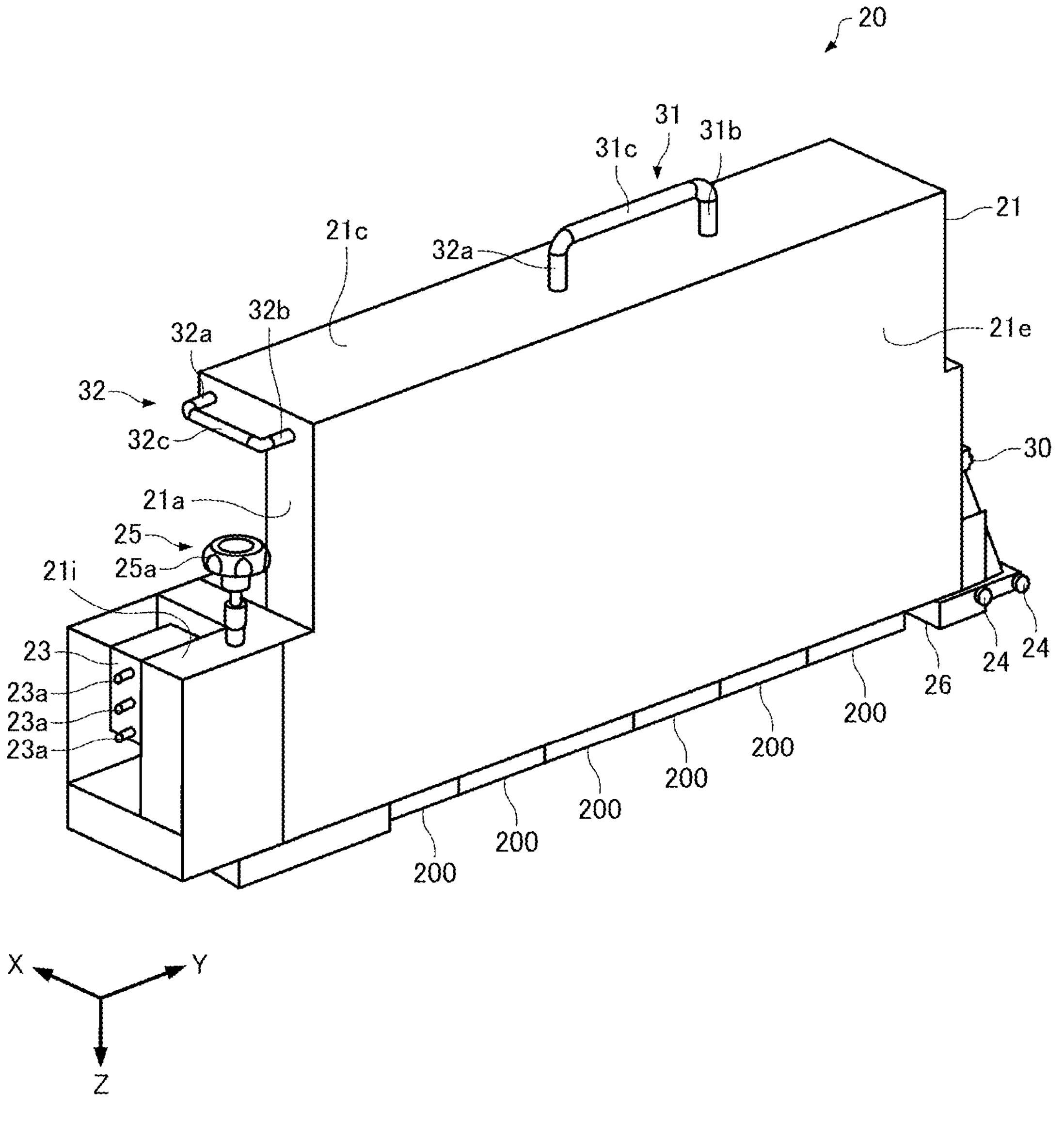
FIG. 4 is a perspective view of a head unit.
Figure 5:
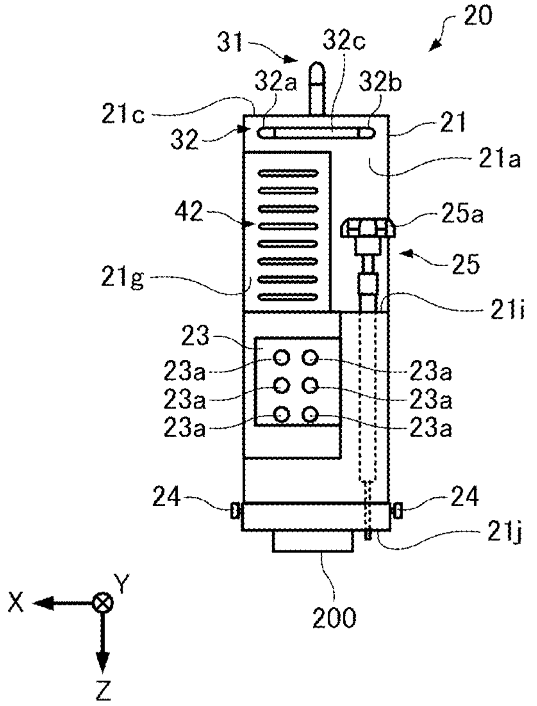
FIG. 5 is an external view of the head unit viewed from the −Y side.
Figure 6:
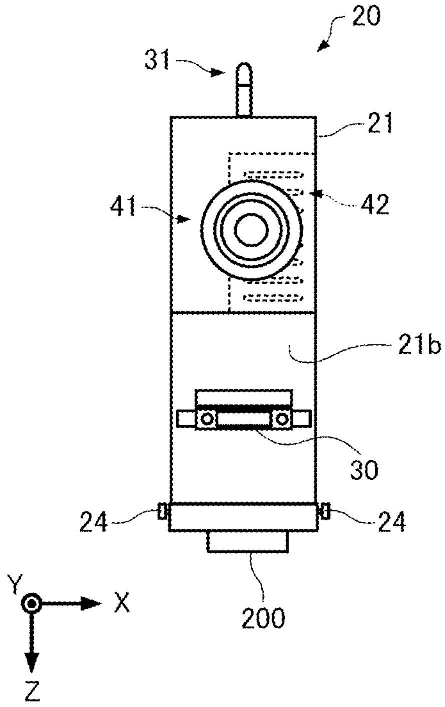
FIG. 6 is an external view of the head unit viewed from the +Y side.
Figure 7:
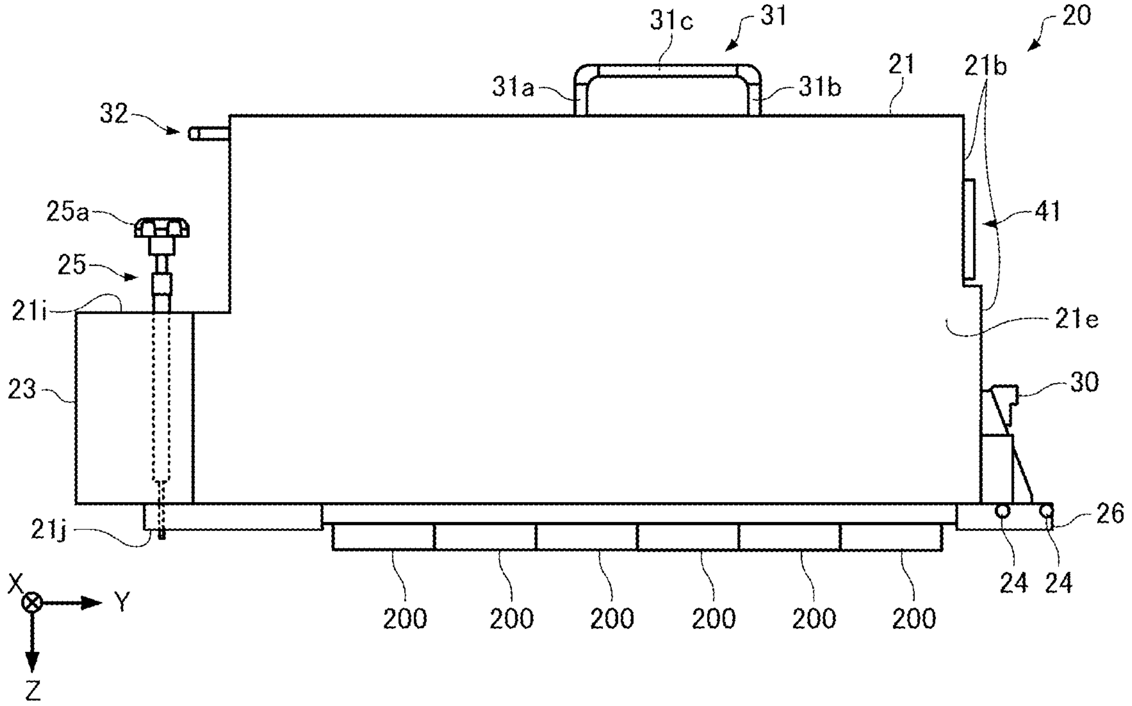
FIG. 7 is an external view of the head unit viewed from the −X side.
Figure 8:
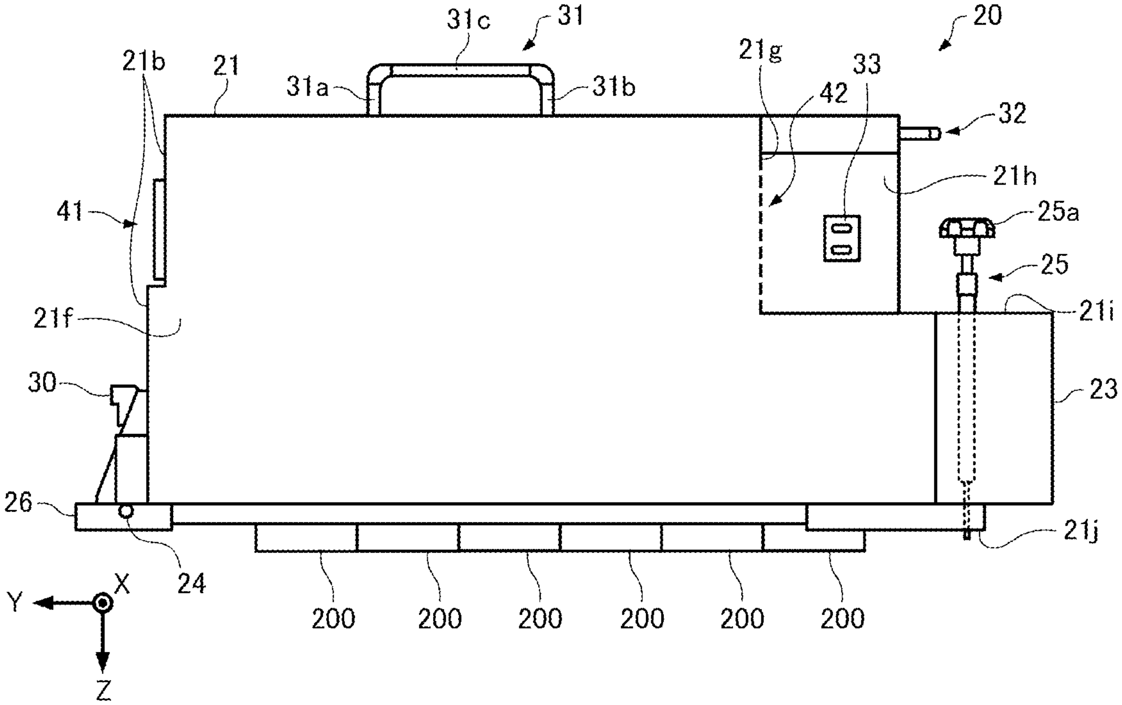
FIG. 8 is an external view of the head unit viewed from the +X side.
Figure 9:
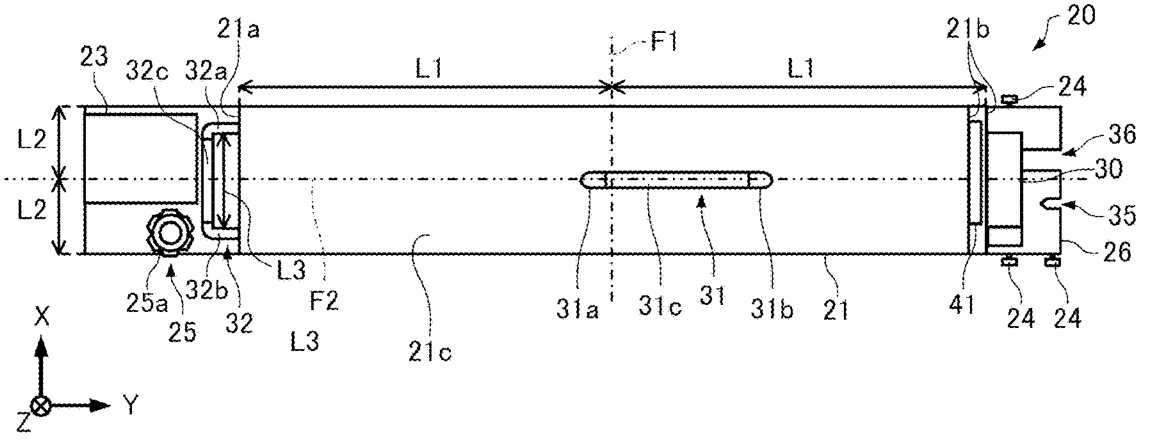
FIG. 9 is an external view of the head unit viewed from the −Z side.
Figure 10:
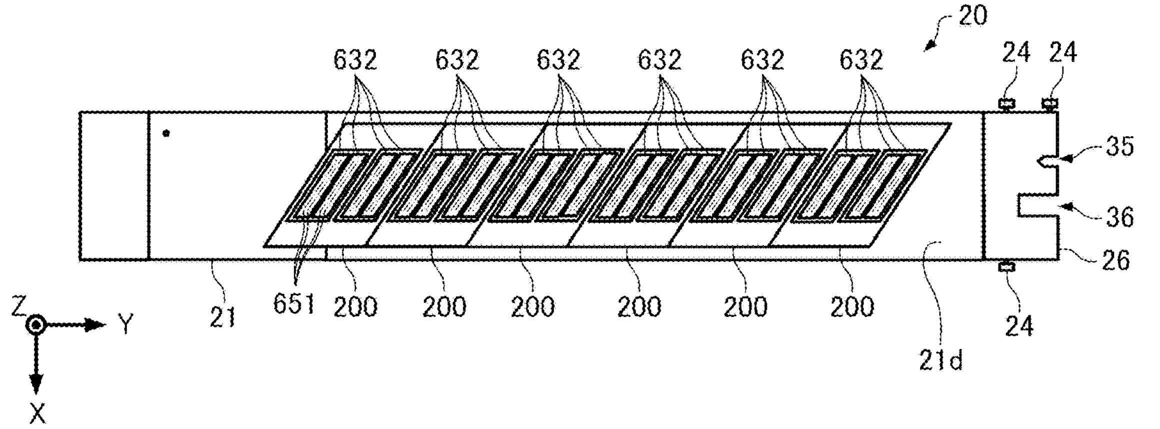
FIG. 10 is an external view of the head unit viewed from the +Z side.

Then, the structure of the head unit 20 will be described with reference to FIGS. 4 to 11. FIG. 4 is a perspective diagram of the head unit 20. FIG. 5 is an external view of the head unit 20 viewed from the −Y side. FIG. 6 is an external view of the head unit 20 viewed from the +Y side. FIG. 7 is an external view of the head unit 20 viewed from the −X side. FIG. 8 is an external view of the head unit 20 viewed from the +X side. FIG. 9 is an external view of the head unit 20 viewed from the −Z side. FIG. 10 is an external view of the head unit 20 viewed from the +Z side.

As illustrated in FIGS. 4 to 10, the head unit 20 includes a housing 21 which houses the control board 110, the drive board 120, the fan 150, and the plurality of print heads 200. The housing 21 is made from metal and is formed of iron or the like, and has a weight no less than 5 kg. The housing 21 is a polygon having a shape approximate to a rectangular solid, and has surfaces 21*a* to 21*f*. The surface 21*a* and the surface 21*b* are surfaces opposite to each other, and are, for example, parallel to each other. The surface 21*c* and the surface 21*d* are surfaces opposite to each other, and are, for example, parallel to each other. The surface 21*e* and the surface 21*f* are surfaces opposite to each other, and are, for example, parallel to each other. Here, a concept that "two surfaces are parallel to each other" includes not only when an angle between the two surfaces is 0°, but also when the angle between the two surfaces slightly deviates from 0° due to manufacturing errors or the like. The surfaces 21*a*, 21*b* cross the surfaces 21*c*, 21*d*, 21*e*, and 21*f*, and are, for example, orthogonal to these surfaces. The surfaces 21*c*, 21*d* cross the surfaces 21*a*, 21*b*, 21*e*, and 21*f*, and are, for example, orthogonal to these surfaces. The surfaces 21*e*, 21*f* cross the surfaces 21*a*, 21*b*, 21*c*, and 21*d*, and are, for example, orthogonal to these surfaces. Here, a concept that "two surfaces are orthogonal to each other" includes not only when an angle between the two surfaces is 90°, but also when the angle between the two surfaces slightly deviates from 90° due to manufacturing errors or the like.

The surfaces 21*c*, 21*d* are longer in the Y direction than in the X direction, and the surfaces 21*e*, 21*f* are longer in the Y direction than in the Z direction. That is, the housing 21 is a polygon longer in the Y direction than in the X direction and the Z direction. When viewed from the operator who performs maintenance of the head unit 20, the surface 21*a* corresponds to a front surface of the housing 21, the surface 21*b* corresponds to a back surface of the housing 21, the surface 21*c* corresponds to an upper surface of the housing 21, the surface 21*d* corresponds to a lower surface of the housing 21, the surface 21*e* corresponds to a right side surface of the housing 21, and the surface 21*f* corresponds to a left side surface of the housing 21.

The head unit 20 further includes surfaces 21*g*, 21*h*. The surface 21*g* is a surface parallel to the surface 21*a* and is a surface located behind the surface 21*a* when the operator views the head unit 20 from the −Y side. That is, as shown in FIG. 5, when the head unit 20 is viewed from the −Y side, the surface 21*g* is also visually recognized together with the surface 21*a*. The surface 21*h* is a surface parallel to the surface 21*c* and is a surface located behind the surface 21*f* when the operator views the head unit 20 from the +X side. That is, as shown in FIG. 8, when the head unit 20 is viewed from the +X side, the surface 21*h* is also visually recognized together with the surface 21*f*.

As shown in FIG. 5, when the head unit 20 is viewed from the −Y side, the surface 21*a* of the housing 21 is visually recognized. That is, the normal direction of the surface 21*a* coincides with the Y direction. The surface 21*a* is provided with a tube coupling section 23 to be coupled to ink tubes as tubes for supplying the ink. The tube coupling section 23 is provided with a plurality of tube attachment ports 23*a*, and the plurality of ink tubes are coupled to the tube coupling section 23 by attaching a tip of the ink tube to each of the tube attachment ports 23*a*. The ink supplied from each of the ink tubes is supplied to each of the print heads 200. In the example in FIGS. 4 to 10, the head unit 20 has six print heads 200, and six tube attachment ports 23*a* are formed to the tube coupling section 23.

Further, a grip 32 is provided to the surface 21*a*. The grip 32 includes a support portion 32*a*, a support portion 32*b*, and a coupling portion 32*c* for coupling the support portion 32*a* and the support portion 32*b* to each other. In the grip 32, the support portions 32*a*, 32*b* are portions which are coupled to the surface 21*a* and are substantially perpendicular to the surface 21*a*, and the coupling portion 32*c* is a portion which couples the support portion 32*a* and the support portion 32*b* to each other, and is substantially parallel to the surface 21*a*. The grip 32 is made from metal and is formed of iron or the like. The grip 32 is provided to the surface 21*a* such that the coupling portion 32*c* extends along the X direction. For example, the grip 32 is provided to the surface 21*a* such that the coupling portion 32*c* is parallel to the X direction.

Further, a fixation mechanism 25 which extends in the Z direction so as to penetrate a hole provided to the surface 21*i* of the housing 21 at the −Y side of the surface 21*a*. The fixation mechanism 25 is a mechanism for fixing the head unit 20 to the carriage 50, and includes a handle 25*a*. When the operator rotates the handle 25*a*, the fixation mechanism 25 moves in the Z direction to penetrate a hole provided to the surface 21*j* of the housing 21 and a hole provided to the carriage 50, and the head unit 20 is fixed to the carriage 50. The fixation mechanism 25 is, for example, a screw.

As shown in FIG. 5, the surface 21*g* is provided with a vent 42. Since the surface 21*g* is a surface parallel to the surface 21*a* and is located at the +Y side of the surface 21*a*, the vent 42 is disposed at a position which can visually recognized when viewing the surface 21*a* from the Y direction. Note that the surface 21*g* may be formed to be coplanar with the surface 21*a*, and the surface 21*a* may be provided with the vent 42.

As shown in FIG. 6, when the head unit 20 is viewed from the +Y side, the surface 21*b* of the housing 21 is visually recognized. That is, the normal direction of the surface 21*b* coincides with the Y direction. The surface 21*b* is parallel to the surface 21*a*, and the direction from the surface 21*a* toward the surface 21*b* also coincides with the Y direction. The surface 21*b* is provided with a connector 30. The connector 30 is fitted into a connector 60 described later of the carriage 50, and power supply voltages VMV, VHV, and VDD and the detection signal ENC of the encoder 130 are supplied from the connector 60. The connector 30 supplies the power supply voltages VMV, VDD to the control board 110 via the connector 60, and supplies the power supply voltages VHV, VDD to the drive board 120 and the six print heads 200. Further, the connector 30 supplies the detection signal ENC of the encoder 130 to the control board 110 via the connector 60.

Further, the surface 21*b* is provided with a vent 41. Note that as shown in FIGS. 7, 8, and 9, the surface 21*b* is formed of two surfaces having a small gap therebetween, and the vent 41 is provided to the surface different from the surface provided with the connector 30. However, the connector 30 and the vent 41 may be provided to the surface 21*b* as a flat surface without a step.

As illustrated in FIG. 5, the shortest distance between the grip 32 and the surface 21*c* is shorter than the shortest distance between the tube coupling section 23 and the surface 21*c*, and is shorter than the shortest distance between the vent 42 and the surface 21*c*. That is, the grip 32 is disposed at a position close to the surface 21*c*. Specifically, the grip 32 is disposed in the uppermost portion of the surface 21*a*.

As shown in FIG. 7, when the head unit 20 is viewed from the −X side, the surface 21*e* of the housing 21 is visually recognized. That is, the normal direction of the surface 21*e* coincides with the X direction. Further, as shown in FIG. 8, when the head unit 20 is viewed from the +X side, the surface 21*f* of the housing 21 is visually recognized. That is, the normal direction of the surface 21*f* coincides with the X direction. The surface 21*f* is parallel to the surface 21*e*, and the direction from the surface 21*e* toward the surface 21*f* also coincides with the X direction. Two rollers 24 are disposed at the surface 21*e* side in a distal end portion 26 coupled to the housing 21 at the +Y side of the housing 21. Further, a single roller 24 is disposed at the surface 21*f* side in the distal end portion 26. The rollers 24 are provided to facilitate mounting of the head unit 20 on the carriage 50.

As shown in FIG. 8, a connector 33 is provided to the surface 21*h*. The connector 33 is, for example, a USB Type-C connector, and is coupled to a connector (not shown) provided to the main board 100 with a wiring cable. The connector 33 supplies the print data pDATA to the control board 110. Note that the surface 21*h* may be formed to be coplanar with the surface 21*f*, and the connector 33 may be provided to the surface 21*f*.

As shown in FIG. 9, when the head unit 20 is viewed from the −Z side, the surface 21*c* of the housing 21 is visually recognized. That is, the normal direction of the surface 21*c* coincides with the Z direction. The surface 21*c* is provided with a grip 31. The grip 31 includes a support portion 31*a*, a support portion 31*b*, and a coupling portion 31*c* for coupling the support portion 31*a* and the support portion 31*b* to each other. In the grip 31, the support portions 31*a*, 31*b* are portions which are coupled to the surface 21*c* and are substantially perpendicular to the surface 21*c*, and the coupling portion 31*c* is a portion which couples the support portion 31*a* and the support portion 31*b* to each other, and is substantially parallel to the surface 21*c*. The grip 31 is made from metal and is formed of iron or the like. The grip 31 is provided on the surface 21*c* such that the coupling portion 31*c* extends along the Y direction. That is, the grip 31 is provided to the surface 21*c* such that the coupling portion 31*c* extends along the longitudinal direction of the housing 21. For example, the grip 31 is provided to the surface 21*c* such that the coupling portion 31*c* is parallel to the Y direction which is the longitudinal direction of the housing 21. Since the liquid ejection apparatus 1 is a large printer, and the head unit 20 has a weight of 5 kg or more, the grip 31 is attached to the housing 21 with screws having a diameter of M4 or more so that the grip 31 is not detached when the operator grasps the grip 31 and lifts the head unit 20. In order to make it less likely to be detached, the grip 31 is preferably attached to the housing 21 with screws having a diameter of M5 or more.

As shown in FIG. 5, when viewed from the Y direction, the grip 31 and the grip 32 do not overlap each other. That is, since the grip 32 provided to the surface 21*a* does not protrude toward the surface 21*c*, when the operator grasps the grip 32 to push and pull the head unit 20, the force is efficiently transmitted to the surface 21*a*. Further, as shown in FIG. 9, when viewed from the Z direction, the grip 31 and the grip 32 do not overlap each other. That is, since the grip 31 provided on the surface 21*c* does not protrude toward the surface 21*a*, it is easy for the operator to grasp the grip 31 to lift the head unit 20 horizontally.

As illustrated in FIG. 9, the coupling portion 31*c* of the grip 31 crosses a first imaginary surface F1 located at an equal distance L1 from the surface 21*b* and the surface 21*a*. Further, the coupling portion 31*c* crosses the second imaginary surface F2 located at an equal distance L2 from the surface 21*e* and the surface 21*f*. That is, the grip 31 is disposed at a position approximate to the center of the surface 21c. In general, since the center position of the surface 21c which is the upper surface of the housing 21 is close to the centroid of the head unit 20, it is easy for the operator to grasp the grip 31 to lift the head unit 20 having the weight no less than 5 kg while keeping the head unit 20 horizontal in the X direction and the Y direction.

As illustrated in FIG. 9, the coupling portion 32c of the grip 32 crosses the second imaginary surface F2 located at the equal distance L2 from the surface 21e and the surface 21f. That is, the grip 32 is disposed so as to cross the center line in the X direction of the surface 21a of the head unit 20. Therefore, the operator can easily grasp the grip 32 to push and pull the head unit 20 in the Y direction while keeping the head unit 20 horizontal in the X direction.

Further, as shown in FIG. 5, the coupling portion 32c is disposed at the uppermost portion of the surface 21a. The length of the coupling portion 32c is 5 cm or more. That is, since a distance L3 between the support portion 32a and the support portion 32b is 5 cm or more, the operator can grasp the grip 32 with three or more fingers. Therefore, the operator can easily push and pull the head unit 20 having the weight no less than 5 kg in the Y direction gripping the grip 32. Further, the operator can easily lift the head unit 20 having the weight no less than 5 kg by gripping the grips 31, 32 with the left and right hands. The grip 32 is attached to the housing 21 with screws having a diameter of M4 or more so that the grip 32 does not detached when the operator grasps the grip 32 to lift the head unit 20 or to pull or push the head unit 20.

Further, as shown in FIG. 9, cutouts 35, 36 are provided in the distal end portion 26. The head unit 20 is fixed to the carriage 50 by the cutouts 35, 36 engaging with a fixation mechanism 55 (described later) of the carriage 50.

As shown in FIG. 10, when the head unit 20 is viewed from the +Z side, the surface 21d of the housing 21 is visually recognized. That is, the normal direction of the surface 21d coincides with the Z direction. The surface 21d is parallel to the surface 21c, and a direction from the surface 21c toward the surface 21d also coincides with the Z direction. The surface 21d is provided with the six print heads 200. As shown in FIGS. 7, 8, and 10, the six print heads 200 are arranged side by side in the Y direction. Note that the number of print heads 200 is not limited to six. As shown in FIG. 10, four nozzle plates 632 arranged in the Y direction are disposed on a lower surface which is a surface at the +Z side of the print head 200, and the plurality of nozzles 651 is arranged in each of the nozzle plates 632 in two rows in the Y direction. That is, two nozzle arrays are formed for each of the six print heads 200, and the four nozzle plates 632 arranged side by side in the Y direction are exposed from the surface 21d of the housing 21. Note that the number of nozzle plates 632 of the print head 200 is not limited to four.

Figure 11:
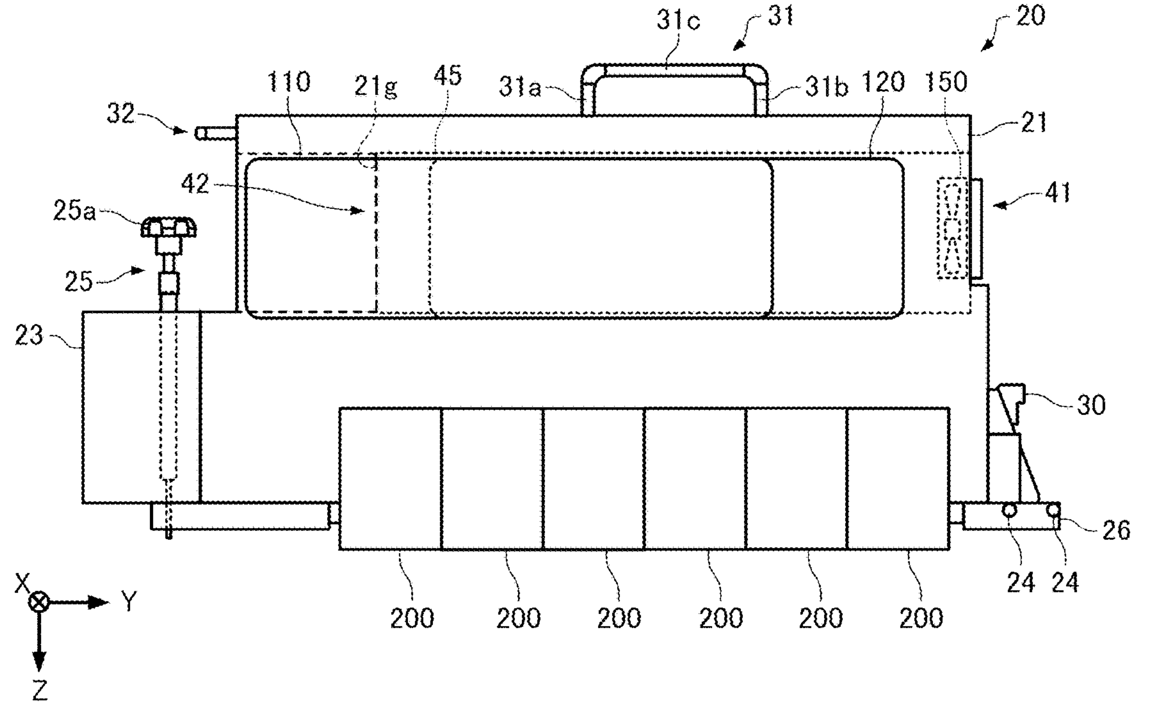
FIG. 11 is a diagram showing an internal structure of the head unit viewed from the −X side.

FIG. 11 is a diagram showing an internal structure of the head unit 20 viewed from the −X side, and is a view of the head unit 20 in a state in which the surface 21e of the housing 21 is not present. As shown in FIG. 11, the control board 110, the drive board 120, and the fan 150 are housed inside the housing 21. Further, in each of the six head units 20, a part thereof including the nozzle plate 632 is exposed from the housing 21, and the rest thereof is housed inside the housing 21. Accordingly, the housing 21 functions as a protective member that protects the control board 110, the drive board 120, and the fan 150 from an impact or ink mist.

The control board 110, the drive board 120, and the fan 150 are disposed at positions closer to the surface 21c as an upper surface than to the surface 21d as a lower surface of the housing 21. Specifically, since the six print heads 200 are provided to the surface 21d, the control board 110, the drive board 120, and the fan 150 are disposed in a space between the six print heads 200 and the surface 21c.

Each of the control board 110 and the drive board 120 is provided so that the normal line of the mounting surface on which electronic components are mounted is aligned with the X direction. The drive board 120 is disposed at the +X side with respect to the control board 110, and when viewed from the X direction, the control board 110 and the drive board 120 partially overlap each other. The control board 110 is coupled to the connector 30 with a wiring cable or a wiring board (not shown), and the power supply voltages VMV, VHV, and VDD and the detection signal ENC of the encoder 130 are supplied from the connector 30. Further, the control board 110 is coupled to the connector 33 with a wiring cable or a wiring board (not shown), and the print data pDATA is supplied from the connector 33. The drive board 120 is coupled to the control board 110 with a BtoB connector (not shown) or the like, and the base drive signals dA and the power supply voltages VHV, VDD are supplied from the control board 110. BtoB is an abbreviation for Board to Board. Each of the six print heads 200 is coupled to the control board 110 and the drive board 120 with a wiring board such as an FPC (not shown), the control signal CtrlD is supplied from the control board 110, and the drive signal COM and the reference voltage signal VBS are supplied from the drive board 120.

Further, a space 45 serving as a passage of a gas is disposed at the +X side of the drive board 120 with the vents 41, 42 at both ends. The control board 110 and the drive board 120 constitute a part of a wall surface of the space 45. The fan 150 is disposed in the space 45 so as to be adjacent to the vent 41. The fan 150 sucks the gas from one of the vents 41, 42 and discharges the gas from the other. For example, when the fan 150 is an intake fan, the vent 41 serves as an intake port, and the vent 42 serves as an exhaust port. Further, when the fan 150 is an exhaust fan, the vent 41 serves as the exhaust port, and the vent 42 serves as the intake port. As shown in FIG. 6, when viewed from the Y direction, at least a part of the vent 41 provided to the surface 21b and at least a part of the vent 42 provided to the surface 21g overlap each other. Therefore, since due to the airflow generated by the fan 150, the gas flows from one of the vents 41, 42 to the other in the space 45 without stagnating, the heat dissipation effect is enhanced, and the control board 110 and the drive board 120 are efficiently cooled.

4. Structure of Carriage

Figure 12:
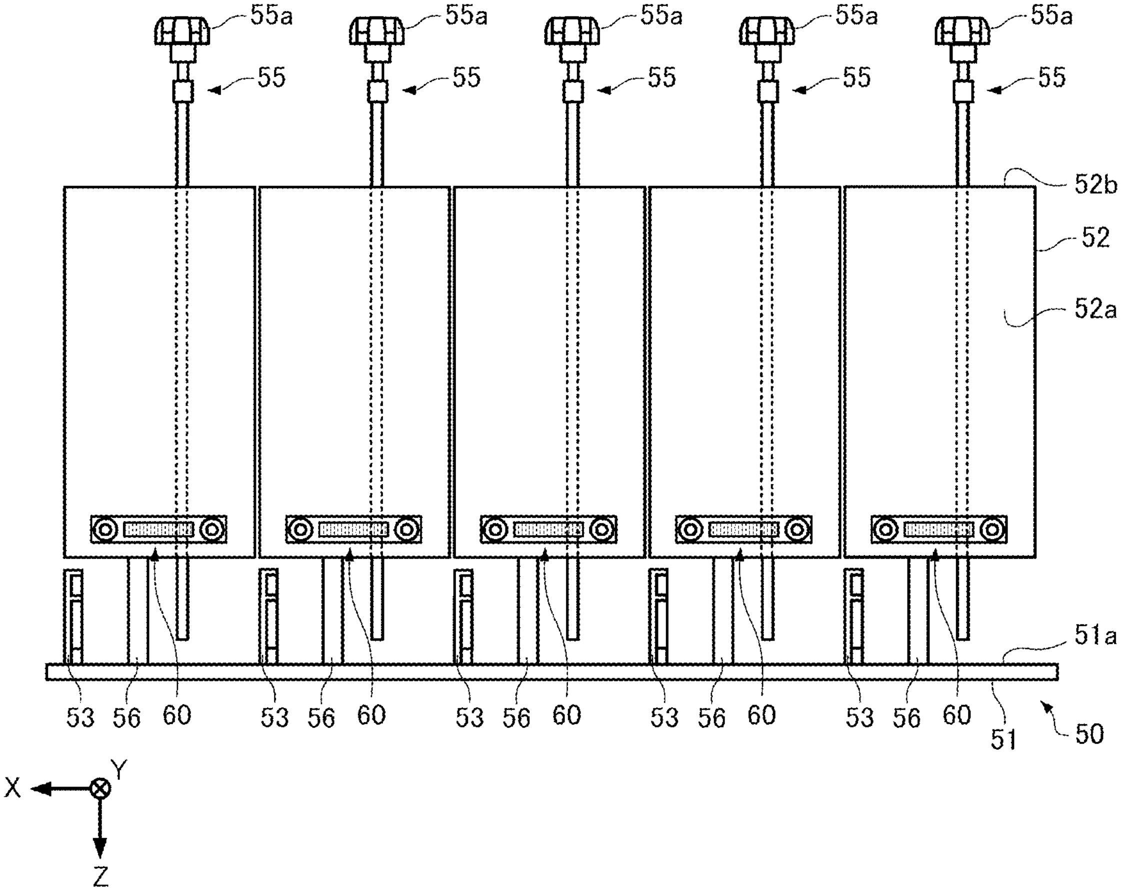
FIG. 12 is an external view of a carriage viewed from the −Y side.
Figure 13:
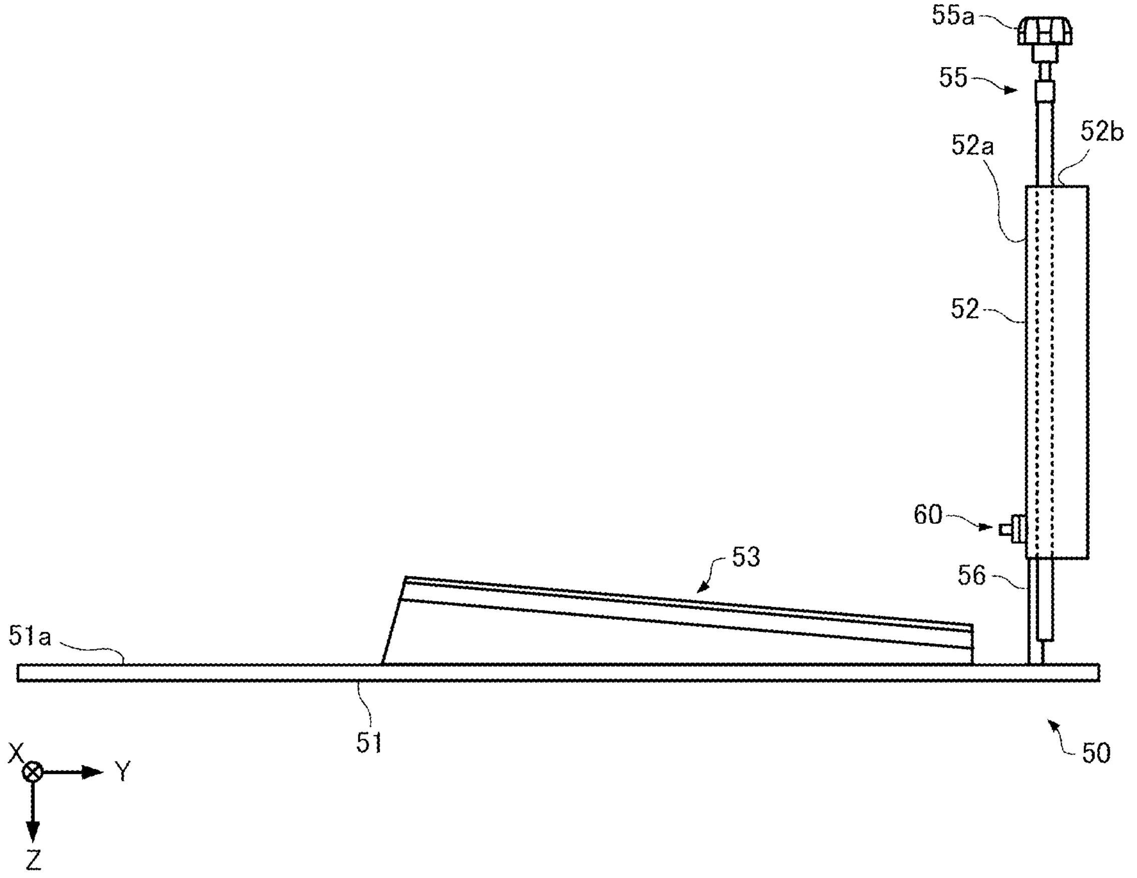
FIG. 13 is an external view of the carriage viewed from the −X side.
Figure 14:
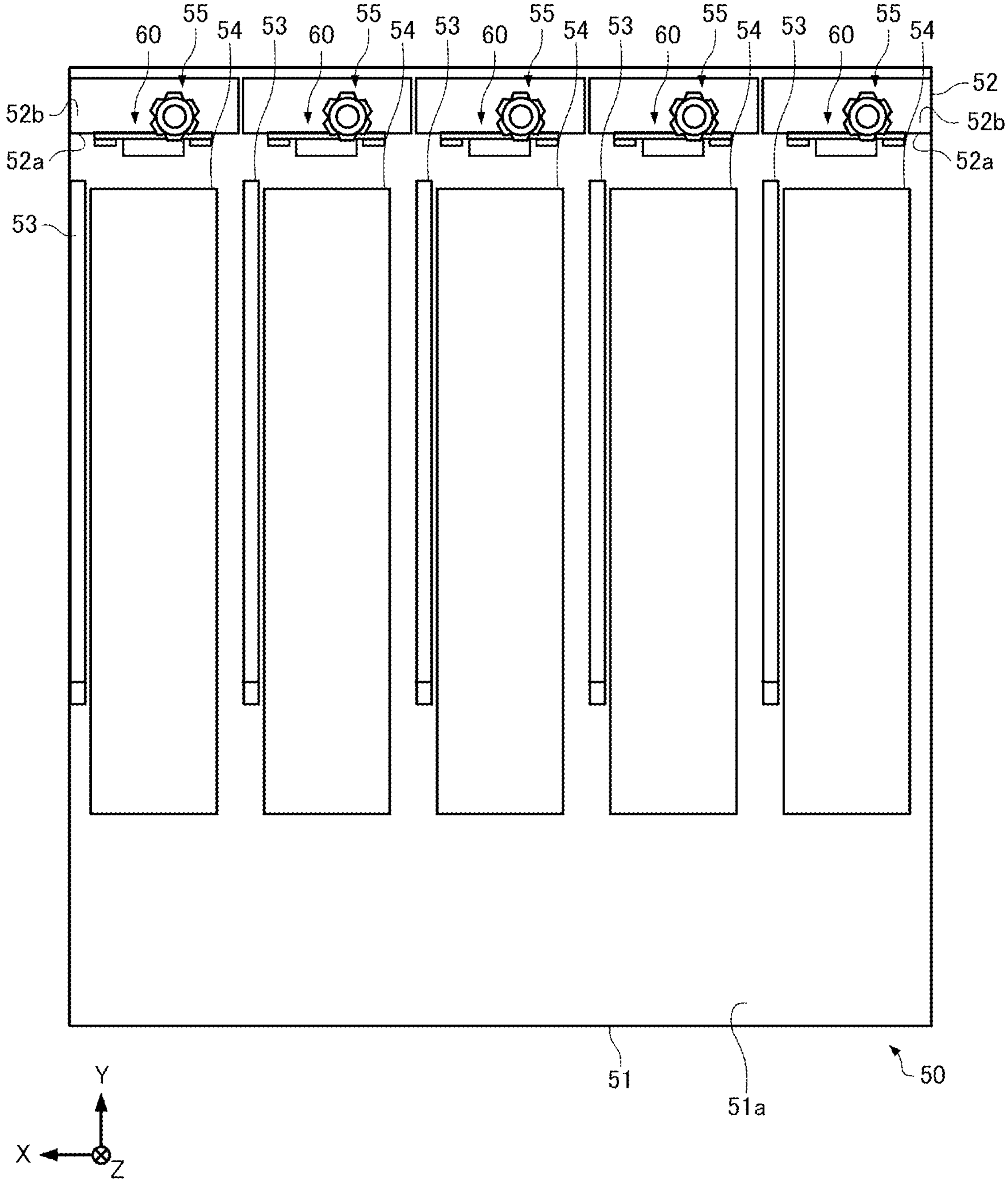
FIG. 14 is an external view of the carriage viewed from the −Z side.

Then, the structure of the carriage 50 will be described with reference to FIGS. 12 to 18. FIG. 12 is an external view of the carriage 50 viewed from the −Y side. FIG. 13 is an external view of the carriage 50 viewed from the −X side. FIG. 14 is an external view of the carriage 50 viewed from the −Z side.

As shown in FIGS. 12 to 14, the carriage 50 includes a bottom plate 51 and a back plate 52. The bottom plate 51, the back plate 52, and rails 53 are made from metal and are formed of iron or the like.

As shown in FIG. 12, when the carriage 50 is viewed from the −Y side, a surface 52a of the back plate 52 is visually recognized. That is, the normal direction of the surface 52a coincides with the Y direction. Further, as shown in FIG. 14, when the carriage 50 is viewed from the −Z side, the surface 51a of the bottom plate 51 is visually recognized. That is, the normal direction of the surface 51a coincides with the Z direction. The surface 52*a* crosses the surface 51*a* and is, for example, orthogonal to the surface 51*a*. Note that since both the bottom plate 51 and the back plate 52 are constituents of the carriage 50, the surface 51*a* of the bottom plate 51 and the surface 52*a* of the back plate 52 are also the surfaces 51*a*, 52*a* of the carriage 50, respectively. Therefore, hereinafter, the surface 51*a* of the bottom plate 51 may be referred to as the surface 51*a* of the carriage 50, and the surface 52*a* of the back plate 52 may be referred to as the surface 52*a* of the carriage 50 in some cases.

As shown in FIGS. 12 to 14, the plurality of connectors 60 is disposed on the surface 52*a* of the carriage 50. The connectors 60 are coupled to a connector (not shown) provided to the main board 100 with a wiring cable. The power supply voltages VMV, VHV, and VDD output from the power supply circuit 102 propagate to the connectors 60 via the wiring cable. Further, the detection signal ENC of the encoder 130 propagates to the connectors 60 via the wiring cable. The connectors 60 are each fitted to the connector 30 of the head unit 20 to supply the power supply voltages VMV, VHV, and VDD and the detection signal ENC of the encoder 130 to the connector 30.

As shown in FIG. 14, a plurality of openings 54 is provided to the surface 51*a* of the carriage 50 so as to correspond to the plurality of connectors 60. The head unit 20 is mounted on the surface 51*a* of the carriage 50 in a state in which the exposed portions of the six print heads 200 are fitted into the opening 54. Further, the plurality of rails 53 is disposed on the surface 51*a* of the carriage 50 so as to correspond to the plurality of openings 54. When the operator replaces the head unit 20 having the weight no less than 5 kg, a workload of the replacement is reduced by sliding the rollers 24 of the head unit 20 along the rail 53.

As shown in FIGS. 12 to 14, the carriage 50 is provided with a plurality of fixation mechanisms 55 extending in the Z direction so as to respectively penetrate a plurality of holes provided to the surface 52*b* of the back plate 52. The fixation mechanism 55 is a mechanism for fixing the head unit 20 to the carriage 50, and includes a handle 55*a*. When the operator rotates the handle 55*a*, the fixation mechanism 55 moves in the Z direction, and the tip portion of the fixation mechanism 55 is inserted through the cutout 35 provided to the head unit 20 and a hole provided to the surface 51*a* of the carriage 50, and the head unit 20 is fixed to the carriage 50. The fixation mechanism 55 is, for example, a screw.

As shown in FIGS. 12 and 13, the carriage 50 is provided with a plurality of guide portions 56 to be coupled to the bottom plate 51 and the back plate 52 so as to correspond to the plurality of connectors 60. The guide portion 56 has a function of engaging with the cutout 36 of the head unit 20 to support positioning of the head unit 20 and the fixation of the head unit 20 to the carriage 50.

In FIGS. 12 to 14, since there are five sets of the connector 60, the rail 53, the opening 54, the fixation mechanism 55, and the guide portion 56, the five head units 20 can be mounted on the carriage 50.

Figure 15:
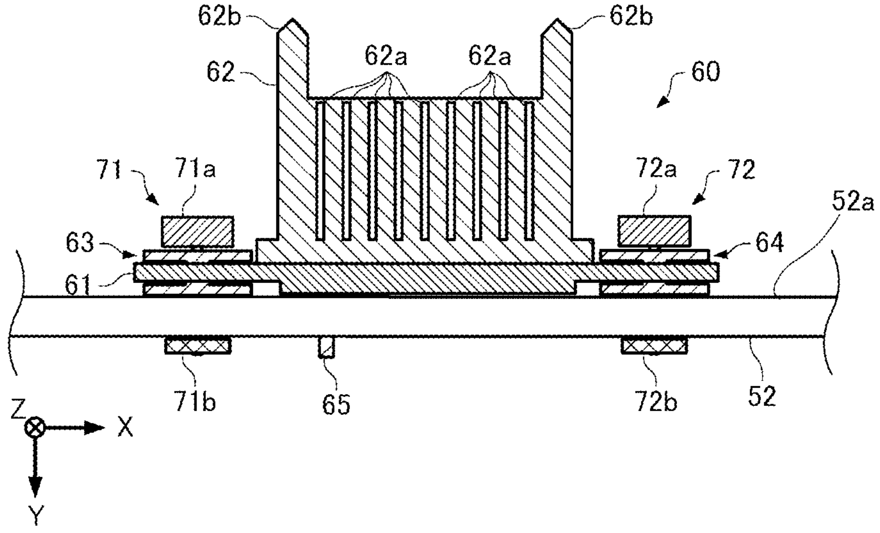
FIG. 15 is an external view of a connector viewed from the −Z side.
Figure 16:
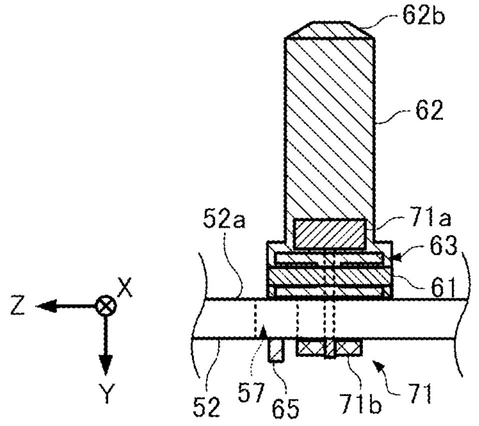
FIG. 16 is an external view of the connector viewed from the −X side.
Figure 17:
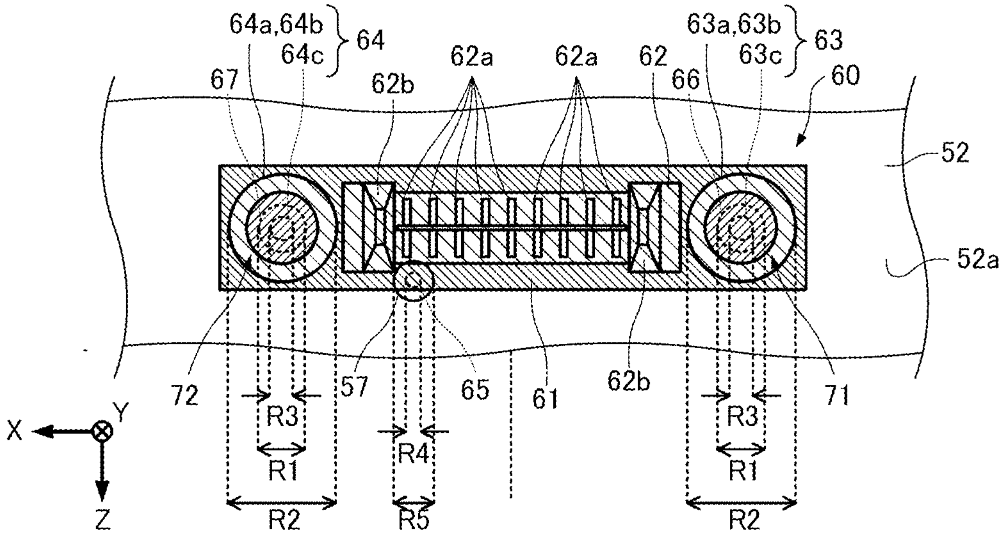
FIG. 17 is an external view of the connector viewed from the −Y side.
Figure 18:
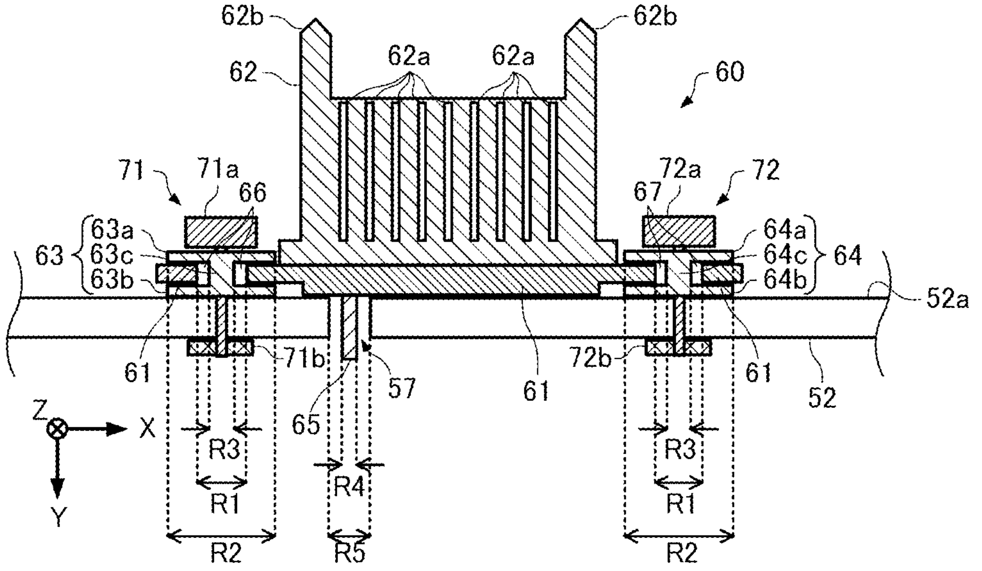
FIG. 18 is a cross-sectional view of the connector viewed from the −Z side.

Then, a structure of the connector 60 will be described with reference to FIGS. 15 to 18. FIG. 15 is an external view of the connector 60 viewed from the −Z side. FIG. 16 is an external view of the connector 60 viewed from the −X side. FIG. 17 is an external view of the connector 60 viewed from the −Y side. FIG. 18 is a cross-sectional view of the connector 60 viewed from the −Z side.

As illustrated in FIGS. 15 to 18, the connector 60 includes a base portion 61, a coupling portion 62, a first holding portion 63, and a second holding portion 64.

As shown in FIGS. 17 and 18, the base portion 61 is provided with a first hole 66 and a second hole 67. As shown in FIGS. 15 to 18, the coupling portion 62 extends from the base portion 61, and is provided with a terminal group formed of a plurality of terminals 62*a* including terminals to which the power supply voltages VMV, VHV, and VDD and the detection signal ENC propagate, respectively. The coupling portion 62 includes a fitting portion 62*b* having a tapered shape. That is, the fitting portion 62*b* has a shape tapered toward the tip portion. The fitting portion 62*b* is a portion to be fitted to the connector 30 of the head unit 20, and the fitting portion 62*b* has the tapered shape, and has therefore a function of guiding the coupling between the connector 30 and the connector 60 to correct the position gap.

As shown in FIGS. 17 and 18, the first holding portion 63 includes a first portion 63*a*, a second portion 63*b*, and a third portion 63*c* which couples the first portion 63*a* and the second portion 63*b* to each other. That is, the first holding portion 63 has a so-called bobbin shape. As shown in FIG. 17, when viewed from the Y direction, the first portion 63*a* and the second portion 63*b* are larger in area than the first hole 66, and the third portion 63*c* is smaller in area than the first hole 66. Further, as illustrated in FIG. 18, when viewed from the Z direction, the first portion 63*a* and the second portion 63*b* do not overlap the first hole 66, and the third portion 63*c* overlaps the first hole 66. That is, the first portion 63*a* and the second portion 63*b* sandwich the first hole 66, and the third portion 63*c* is inserted through the first hole 66.

As shown in FIGS. 17 and 18, the second holding portion 64 includes a fourth portion 64*a*, a fifth portion 64*b*, and a sixth portion 64*c* which couples the fourth portion 64*a* and the fifth portion 64*b* to each other. That is, the second holding portion 64 has a so-called bobbin shape. As shown in FIG. 17, when viewed from the Y direction, the fourth portion 64*a* and the fifth portion 64*b* are larger in area than the second hole 67, and the sixth portion 64*c* is smaller in area than the second hole 67. Further, as shown in FIG. 18, when viewed from the Z direction, the fourth portion 64*a* and the fifth portion 64*b* do not overlap the second hole 67, and the sixth portion 64*c* overlaps the second hole 67. That is, the fourth portion 64*a* and the fifth portion 64*b* sandwich the second hole 67, and the sixth portion 64*c* is inserted through the second hole 67.

Here, as shown in FIG. 18, the length in the Y direction of the third portion 63*c* of the first holding portion 63 is larger than the thickness of the base portion 61 which is the length in the Y direction of the first hole 66. Similarly, the length in the Y direction of the sixth portion 64*c* of the second holding portion 64 is larger than the thickness of the base portion 61 which is the length in the Y direction of the second hole 67. That is, in the Y direction, there are gaps between the first portion 63*a* of the first holding portion 63 and the base portion 61, between the second portion 63*b* of the first holding portion 63 and the base portion 61, between the fourth portion 64*a* of the second holding portion 64 and the base portion 61, and between the fifth portion 64*b* of the second holding portion 64 and the base portion 61.

Further, as shown in FIG. 17, when viewed from the Y direction, an outer edge of the first hole 66 is a circle having a first diameter R1, an outer edge of the first portion 63*a* is a circle having a second diameter R2 larger than the first diameter R1, an outer edge of the second portion 63*b* is a circle having the second diameter R2, and an outer edge of the third portion 63*c* is a circle having a third diameter R3 smaller than the first diameter R1. Similarly, when viewed from the Y direction, an outer edge of the second hole 67 is a circle having the first diameter R1, an outer edge of the fourth portion 64*a* is a circle having the second diameter R2, an outer edge of the fifth portion 64*b* is a circle having the second diameter R2, and an outer edge of the sixth portion 64*c* is a circle having the third diameter R3.

Further, when the center of the circle of the outer edge of the first hole 66 and the center of the circle of the outer edge of the third portion 63*c* coincide with each other, the center of the circle of the outer edge of the second hole 67 and the center of the circle of the outer edge of the sixth portion 64*c* coincide with each other. Therefore, the base portion 61 is movable in any directions in the X-Z plane within a range of a difference between the first diameter R1 and the third diameter R3, with respect to the first holding portion 63 and the second holding portion 64 fixed to the surface 52*a* of the carriage 50. In this way, the first holding portion 63 is inserted through the first hole 66 to hold the base portion 61 so as to be movable within a predetermined range. Similarly, the second holding portion 64 is inserted through the second hole 67 to hold the base portion 61 so as to be movable within a predetermined range. An upper limit of the predetermined range is a difference between the first diameter R1 and the third diameter R3.

Note that when viewed from the Y direction, the outer edges of the first portion 63*a*, the second portion 63*b*, and the third portion 63*c* of the first holding portion 63 are not limited to circles, and may be polygonal shapes such as hexagonal shapes. Similarly, when viewed from the Y direction, the outer edges of the fourth portion 64*a*, the fifth portion 64*b*, and the sixth portion 64*c* of the second holding portion 64 are not limited to circles, and may be polygonal shapes such as hexagonal shapes.

As illustrated in FIGS. 15 to 18, the carriage 50 includes first fixation members 71 and second fixation members 72 that fix the connectors 60 to the surface 52*a* of the carriage 50. The first fixation member 71 fixes the first holding portion 63 to the surface 52*a* of the carriage 50, and the second fixation member 72 fixes the second holding portion 64 to the surface 52*a* of the carriage 50. As shown in FIGS. 15 and 18, for example, the first fixation member 71 includes a first bolt 71*a* and a first nut 71*b*, and the second fixation member 72 includes a second bolt 72*a* and a second nut 72*b*. A screw hole (not shown) is provided to the first holding portion 63 at a position overlapping the center of the circle as the outer edge when viewed from the Y direction, and the first holding portion 63 is fixed to the surface 52*a* of the carriage 50 by the first bolt 71*a* being inserted through that screw hole, and further penetrating the back plate 52 to be fitted to the first nut 71*b*. Similarly, a screw hole (not shown) is provided to the second holding portion 64 at a position overlapping the center of the circle as the outer edge when viewed from the Y direction, and the second holding portion 64 is fixed to the surface 52*a* of the carriage 50 by the second bolt 72*a* being inserted through that screw hole, and further penetrating the back plate 52 to be fitted to the second nut 72*b*. Note that the first fixation member 71 and the second fixation member 72 are not limited to what is configured with a bolt and a nut, and may be any members that can fix the connector 60 to the surface 52*a* of the carriage 50.

As described above, in the connector 60, the coupling portion 62 provided with the terminal group can move relatively to the first holding portion 63 and the second holding portion 64 fixed to the surface 52*a* of the carriage 50 with the first fixation member 71 and the second fixation member 72 in a predetermined range together with the base portion 61. Specifically, the base portion 61 and the coupling portion 62 can move relatively to the first holding portion 63 and the second holding portion 64 by a gap between the third portion 63*c* and the first hole 66 and a gap between the sixth portion 64*c* and the second hole 67. Therefore, even when the position at which the connector 60 and the connector 30 provided to the head unit 20 are fitted is displaced within a predetermined range, the coupling portion 62 of the connector 60 can move to engage with the connector 30.

As shown in FIGS. 15 to 18, the connector 60 may include a guide portion 65. The guide portion 65 is inserted through a hole 57 provided to the back plate 52 of the carriage 50. As shown in FIG. 17, when viewed from the Y direction, an outer edge of the hole 57 is a circle having a fourth diameter R4, and an outer edge of the guide portion 65 is a circle having a fifth diameter R5 larger than the fourth diameter R4. Here, the difference between the fifth diameter R5 and the fourth diameter R4 is larger than the difference between the first diameter R1 and the third diameter R3. Further, when the center of the circle of the outer edge of the first hole 66 and the center of the circle of the outer edge of the third portion 63*c* coincide with each other, and the center of the circle of the outer edge of the second hole 67 and the center of the circle of the outer edge of the sixth portion 64*c* coincide with each other, the center of the circle of the outer edge of the hole 57 coincides with the center of the circle of the outer edge of the guide portion 65. Therefore, when the base portion 61 moves in a predetermined range, the guide portion 65 also moves accordingly, but since the difference between the fifth diameter R5 and the fourth diameter R4 is larger than the difference between the first diameter R1 and the third diameter R3, the guide portion 65 can move without making contact with the hole 57. That is, the guide portion 65 can move without restricting the movable range of the base portion 61. The guide portion 65 and the hole 57 have a function of positioning the connector 60 when fixing the connector 60 to the back plate 52 with the first fixation member 71 and the second fixation member 72. Further, even when the first fixation member 71 or the second fixation member 72 is detached, the guide portion 65 and the hole 57 function to maintain the connector 60 in an approximately horizontal state, and also have a function of preventing the head unit 20 from being largely inclined to be damaged.

5. Coupling Between Head Unit and Carriage

Figure 19:
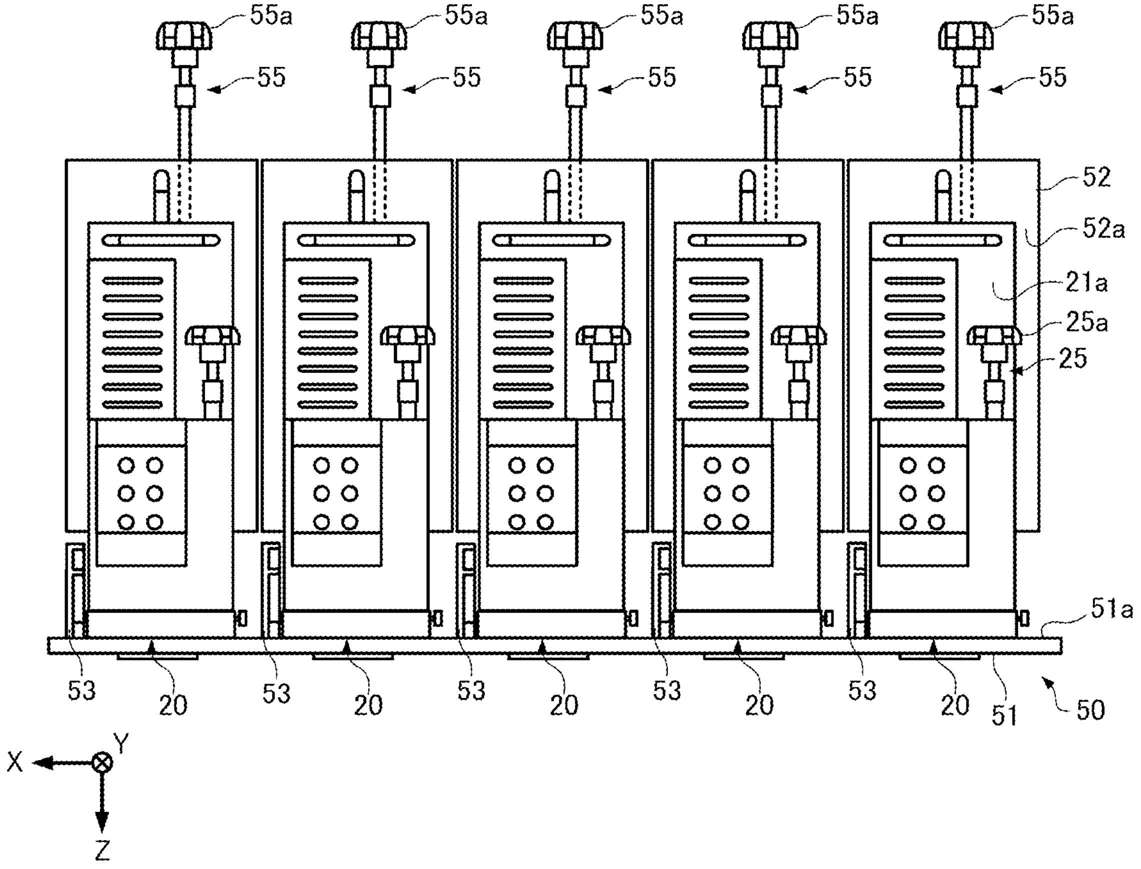
FIG. 19 is an external view of the carriage on which the head units are mounted, viewed from the −Y side.
Figure 20:
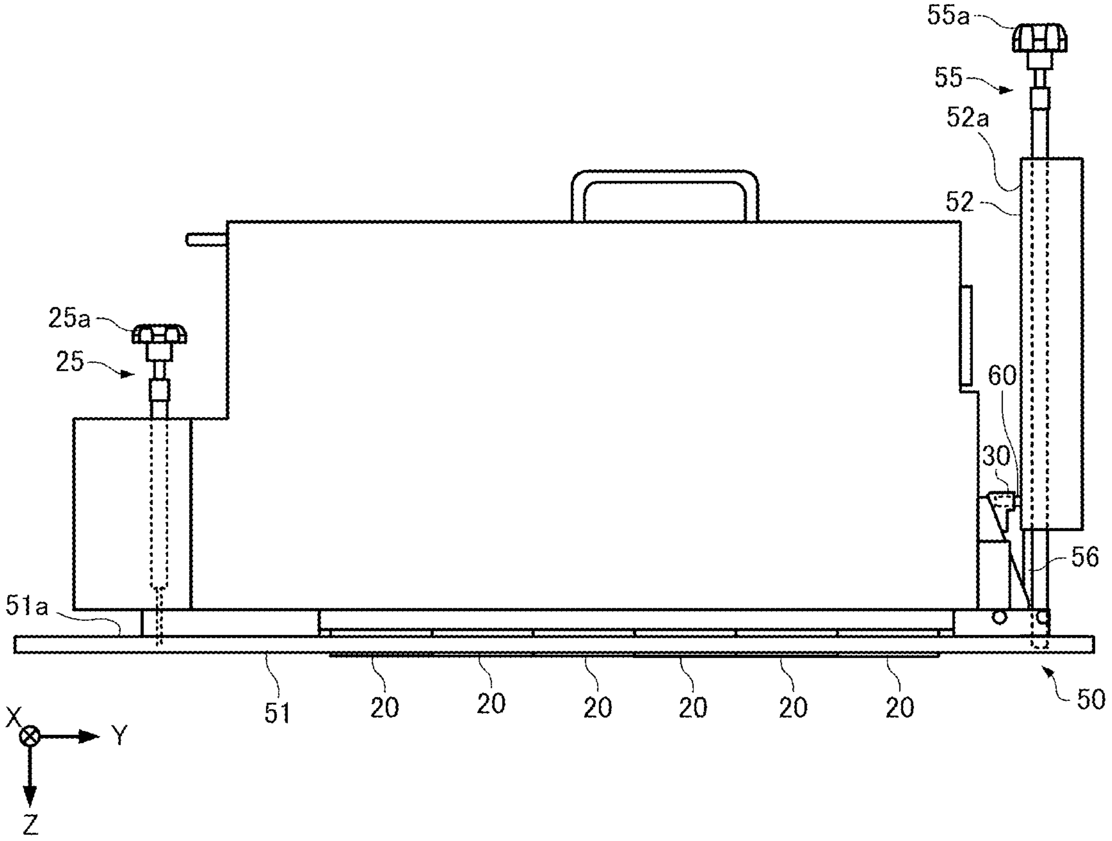
FIG. 20 is an external view of the carriage on which the head units are mounted, viewed from the −X side.

Then, a coupling structure between the head unit 20 and the carriage 50 will be described with reference to FIGS. 19 and 20. FIG. 19 is an external view of the carriage 50 on which the head units 20 are mounted viewed from the −Y side. FIG. 20 is an external view of the carriage 50 on which the head units 20 are mounted viewed from the −X side.

As shown in FIGS. 19 and 20, the head units 20 are fixed to the carriage 50 by the fixation mechanisms 55, 25. Since the weight of the head unit 20 is 5 kg or more, in order to prevent the head unit 20 from being damaged due to breakage of at least one of the fixation mechanisms 55, 25, relatively high strength is required for the fixation mechanisms 55, 25. Therefore, metals high in hardness such as iron, poly-oxy-benzyl-methylene-glycol-anhydride, or the like may be used as the materials of the fixation mechanisms 55, 25.

Meanwhile, resin is used as the material of the connector 30 of the head unit 20 and the connector 60 of the carriage 50. Therefore, the connector 30 and the connector 60 are low in strength and are easily broken. As shown in FIG. 20, since the connector 60 and the connector 30 are fitted to each other in the Y direction, when the operator supposedly fixes the head unit 20 to the carriage 50 in the Y direction, there is a possibility that the connector 30 or the connector 60 may be damaged by the stress applied to the connector 30 or the connector 60 when the crimping force for the fixation is excessive even slightly.

Therefore, in the present embodiment, as shown in FIGS. 19 and 20, when viewed from the X direction, the connector 60 and the connector 30 are located between the fixation mechanism 55 and the fixation mechanism 25, and the fixation mechanism 55 and the fixation mechanism 25 fix the head unit 20 in the Z direction. That is, the direction of the electrical coupling between the head unit 20 and the carriage 50 with the connectors 60, 30 and the direction of the mechanical coupling between the head unit 20 and the carriage 50 by the fixation mechanisms 55, 25 are made orthogonal to each other. As a result, even when the crimping force for fixing the head unit 20 is somewhat excessive, the stress applied to the connectors 60, 30 is not large, and therefore, the risk of damage to the connectors 60, 30 is reduced. Furthermore, in the connector 60, since the base portion 61 including the fitting portion 62*b* is movable within a predetermined range, the stress to be applied to the connectors 60, 30 is reduced, and the connectors 60, 30 are more difficult to be damaged.

Further, the Y direction, which is the direction of the electrical coupling between the head unit 20 and the carriage 50, and the Z direction, which is the direction of the mechanical coupling, are both orthogonal to the X direction in which the carriage 50 moves during printing. Therefore, since the direction of inertial force caused by the movement of the carriage 50 is orthogonal to the direction of the electrical coupling between the head unit 20 and the carriage 50 and the direction of the mechanical coupling therebetween, the possibility that these couplings are released or destabilized by the inertial force is low. Therefore, both the stability of the electrical coupling and the stability of the mechanical coupling are improved.

As shown in FIGS. 19 and 20, a part of the head unit 20 is located between the handle 55*a* of the fixation mechanism 55 and the surface 51*a* of the carriage 50, and another part of the head unit 20 is located between the handle 25*a* of the fixation mechanism 25 and the surface 51*a* of the carriage 50. That is, since the handles 55*a*, 25*a* are both located above the head unit 20, it is easy for the operator to operate the handles 55*a*, 25*a*, and the work for replacing the head unit 20 becomes easy. Further, as shown in FIGS. 19 and 20, the shortest distance between the handle 55*a* and the surface 52*a* of the carriage 50 is shorter than the shortest distance between the handle 25*a* and the surface 52*a* of the carriage 50, and the shortest distance between the handle 55*a* and the surface 51*a* of the carriage 50 is longer than the shortest distance between the handle 25*a* and the surface 51*a* of the carriage 50. That is, when viewed from the operator, since the handle 55*a* located at the back side is higher in position than the handle 25*a* located at the front side, it becomes easy for the operator to operate the handles 55*a*, 25*a*, and the work for replacing the head unit 20 becomes easy.

Further, since the tube coupling section 23 is provided to the surface 21*a* of the head unit 20, it results in that the tube coupling section 23 is located in front of the operator in the state in which the head unit 20 is fixed to the carriage 50 as shown in FIG. 19. Therefore, it becomes easy for the operator to perform the work of attaching an end of the ink tube to the tube attachment port 23*a* of the tube coupling section 23.

Figure 21:
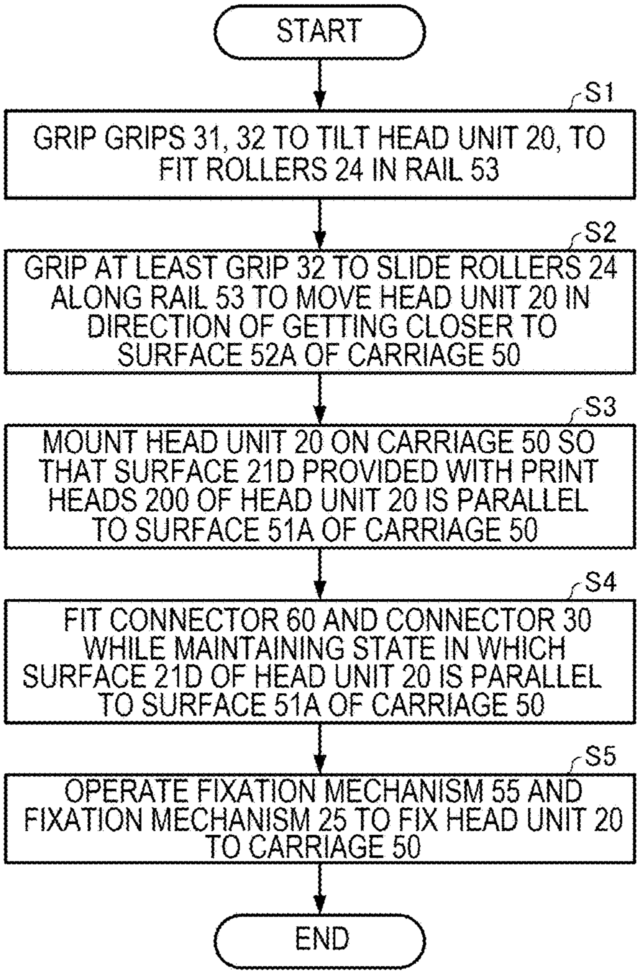
FIG. 21 is a flowchart representing an example of a procedure of a method of coupling the head unit.

Then, a method of coupling the head unit 20 and the carriage 50 to each other will be described with reference to FIGS. 21 to 25. FIG. 21 is a flowchart representing an example of a procedure of the method of coupling the head unit for coupling the carriage 50 to the head units 20. FIGS. 22 to 25 are diagrams illustrating the state of respective steps in FIG. 21.

Figure 22:
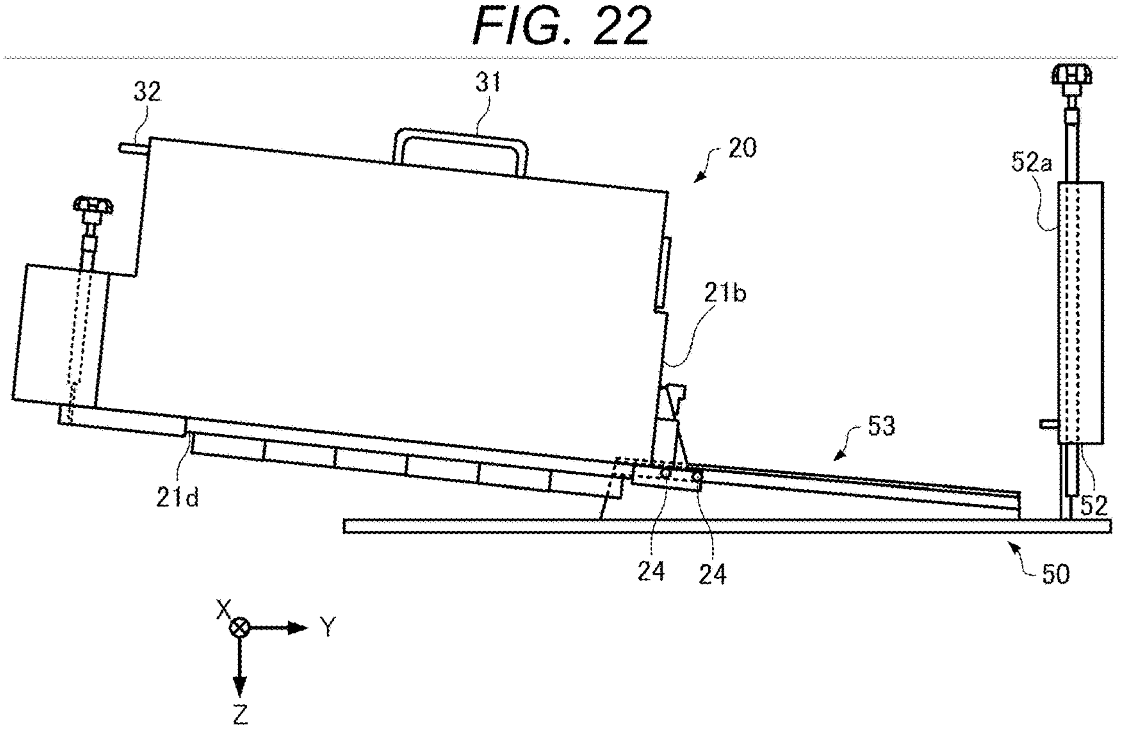
FIG. 22 is a diagram illustrating a state of step S1 in FIG. 21.

First, in step S1 in FIG. 21, as shown in FIG. 22, the operator grasps the grips 31, 32 and tilts the head unit 20 to fit the rollers 24 to the rail 53.

Figure 23:
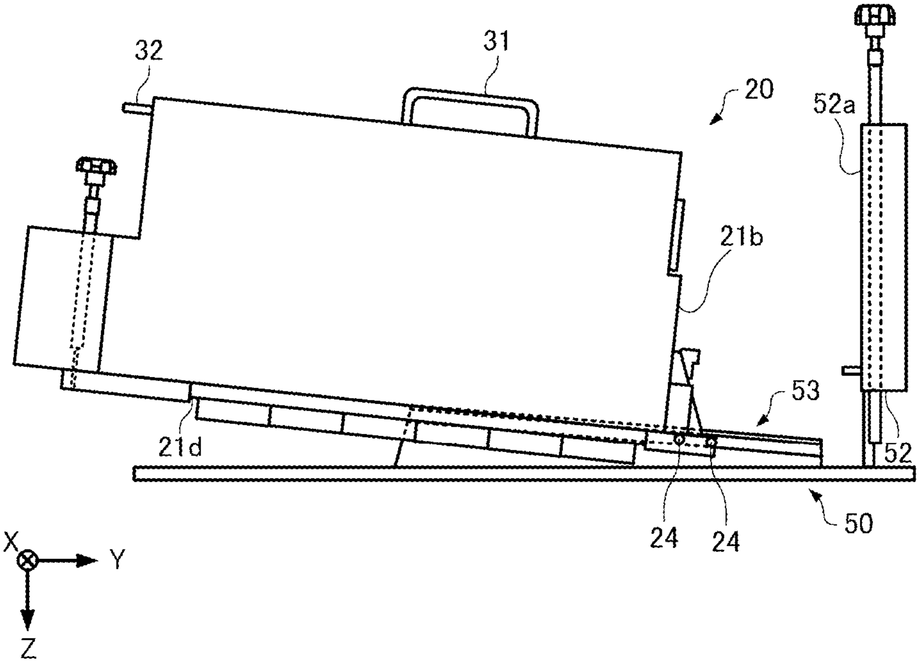
FIG. 23 is a diagram illustrating a state of step S2 in FIG. 21.

Then, in step S2, as shown in FIG. 23, the operator grips at least the grip 32 and slides the rollers 24 along the rail 53 to move the head unit 20 in a direction of getting closer to the surface 52*a* of the carriage 50. As described above, the grip 32 and the rollers 24 are used when the head unit 20 is moved in the direction of getting closer to the surface 52*a* of the carriage 50 and to be mounted on the carriage 50.

Figure 24:
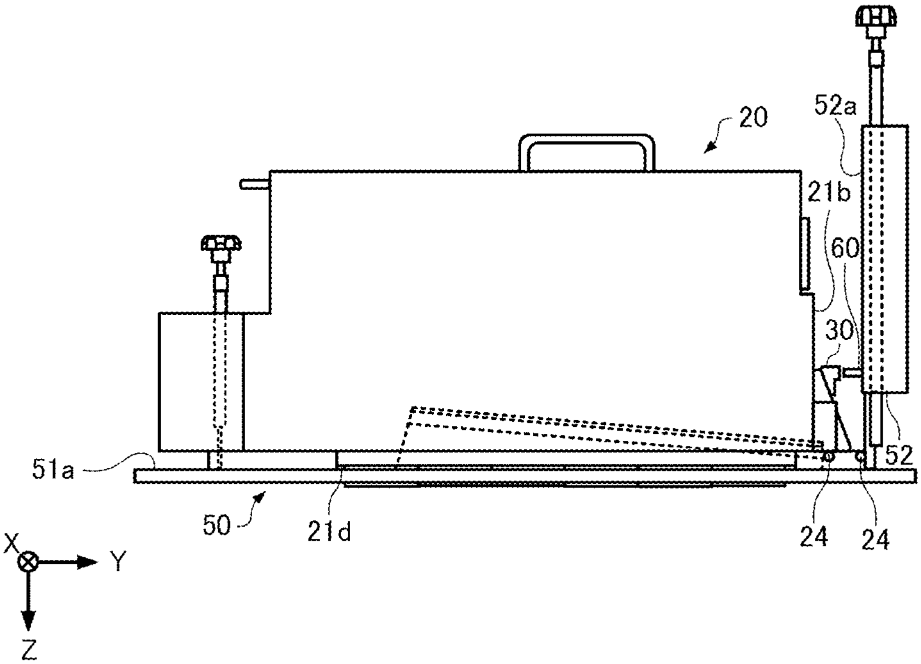
FIG. 24 is a diagram illustrating a state of step S3 in FIG. 21.

Then, in step S3, as shown in FIG. 24, the operator mounts the head unit 20 on the carriage 50 such that the surface 21*d* of the head unit 20 on which the print heads 200 are disposed is parallel to the surface 51*a* of the carriage 50.

Figure 25:
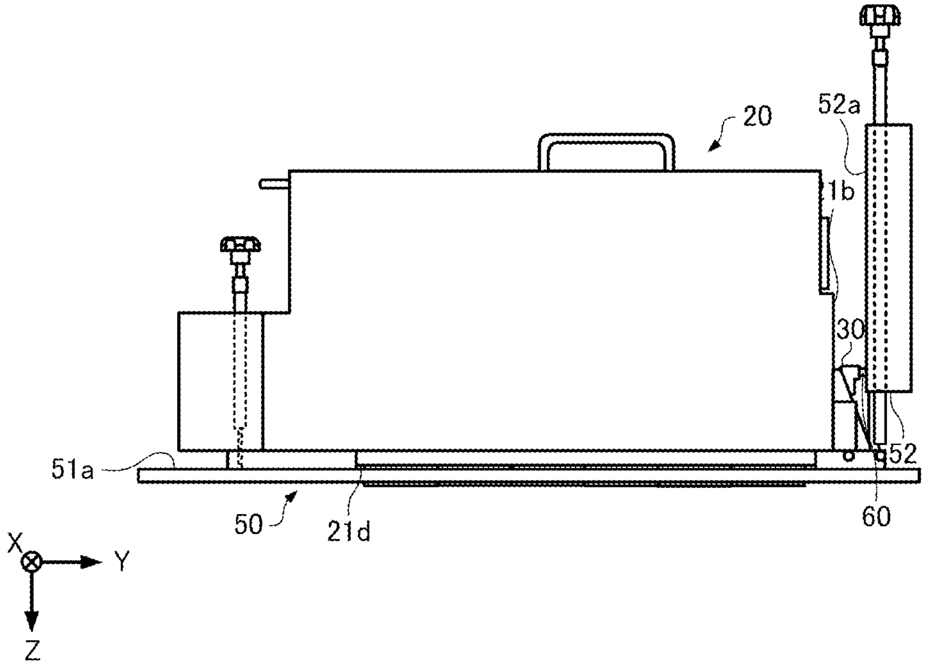
FIG. 25 is a diagram illustrating a state of step S4 in FIG. 21.

Then, in step S4, as shown in FIG. 25, the operator fits the connector 60 and the connector 30 to each other while maintaining a state in which the surface 21*d* of the head unit 20 and the surface 51*a* of the carriage 50 are parallel to each other.

Figure 26:
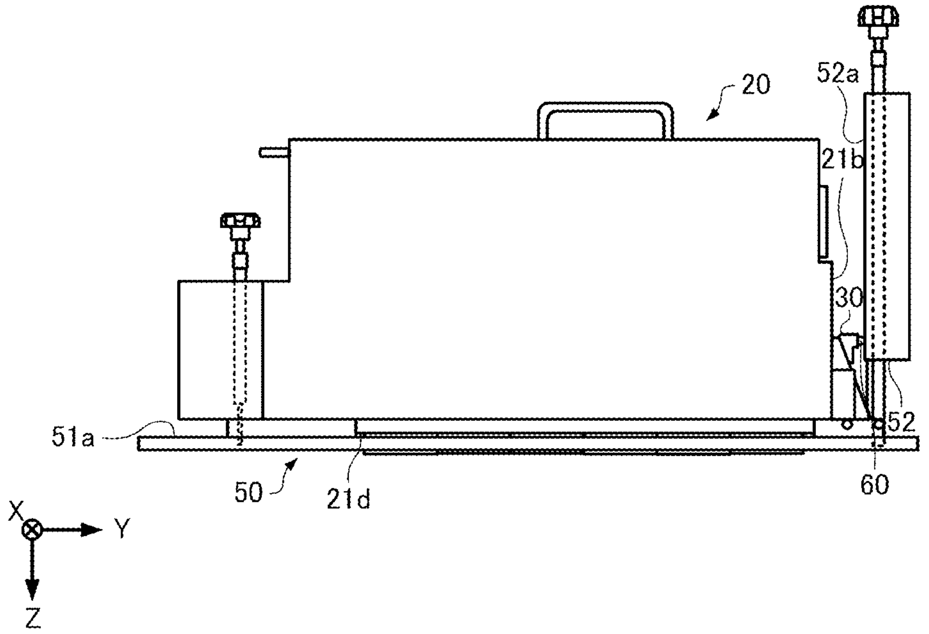
FIG. 26 is a diagram illustrating a state of step S5 in FIG. 21.

Finally, in step S5, as shown in FIG. 26, the operator operates the fixation mechanism 55 and the fixation mechanism 25 to fix the head unit 20 to the carriage 50.

Note that in the present embodiment, the print head 200 is an example of a "liquid ejection head". The Z direction is an example of a "first direction", the Y direction is an example of a "second direction", and the X direction is an example of a "third direction". The surface 21*b* is an example of a "first surface", the surface 21*a* is an example of a "second surface", the surface 21*d* is an example of a "third surface", the surface 21*c* is an example of a "fourth surface", the surface 21*e* is an example of a "fifth surface", and the surface 21*f* is an example of a "sixth surface". The grip 31 is an example of a "first grip", and the grip 32 is an example of a "second grip". The support portion 31*a* is an example of a "first support portion", the support portion 31*b* is an example of a "second support portion", the support portion 32*a* is an example of a "third support portion", and the support portion 32*b* is an example of a "fourth support portion". The coupling portion 31*c* is an example of a "first coupling portion", and the coupling portion 32*c* is an example of a "second coupling portion". The vent 41 is an example of a "first vent", and the vent 42 is an example of a "second vent".

6. Functions and Advantages

As described above, according to the liquid ejection apparatus 1 related to the present embodiment, since the grip 31 is provided to the surface 21*c* opposite to the surface 21*d* provided with the print heads 200 of the housing 21 so that the coupling portion 31*c* extends along the Y direction in the head unit 20, it is easy for the operator to grasp the grip 31 to lift the head unit 20 while keeping the head unit 20 horizontal. Further, since the grip 32 is provided to the surface 21*a* crossing the surface 21*d* provided with the print heads 200, it is easy for the operator to grasp the grip 32 to push and pull the head unit 20. Further, since the connector 30 is provided to the surface 21*b* opposite to the surface 21*a* provided with the grip 32 in the head unit 20, it is possible for the operator to grasp the grip 32 to press the head unit 20 thereinto to thereby fit the connector 30 to the connector 60 provided to the surface 52*a* of the carriage 50. Since the grip 32 is disposed such that the coupling portion 32*c* extends along the X direction at a position closer to the surface 21*d* than the tube coupling section 23 and the vent 42, it is easy for the operator to grasp the grips 31, 32 with both hands to lift the head unit 20, and further to grasp the grip 32 to fine-tune the tilt of the head unit 20 when pushing and pulling the head unit 20 along the rail 53. In particular, since the grip 31 provided to the surface 21*c* does not protrude toward the surface 21*a*, it is easy for the operator grasp the grip 31 to horizontally lift the head unit 20, and since the grip 32 provided to the surface 21*a* does not protrude toward the surface 21*c*, the force is efficiently transmitted to the surface 21*a* when the operator grasps the grip 32 to push and pull the head unit 20.

Further, according to the liquid ejection apparatus 1 related to the present embodiment, in the head unit 20, since the grip 31 is disposed at a position close to the center of the surface 21*c*, it is easy for the operator to grasp the grip 31 to lift the head unit 20 while keeping the head unit 20 horizontal. Further, since the grip 32 is disposed so as to cross the center line in the X direction of the surface 21*a*, it is easy for the operator to fine-tune the tilt of the head unit 20 so as to be aligned with the rail 53 while keeping the head unit 20 horizontal in the X direction. Further, since the operator can grasp the grip 32 with three or more fingers, even when the head unit 20 is heavy in weight, it is easy for the operator to tilt the head unit 20 so as to be aligned with the rail 53 to push and pull the head unit 20.

Therefore, according to the liquid ejection apparatus 1 related to the present embodiment, even when the weight of the head unit 20 is 5 kg or more, the possibility that the operator makes the print heads 200 collide with the surrounding objects to be damaged when lifting, pushing, or pulling the head unit 20 is reduced.

Further, according to the liquid ejection apparatus 1 related to the present embodiment, since the housing 21 is made from metal and is therefore high in strength, the possibility that the housing 21 is damaged by the stress applied when lifting, pushing, or pulling the head unit 20 is reduced. Further, since the grips 31, 32 are made from metal, and are therefore high in strength, a deformation and breakage of the grips 31, 32 less likely occur when lifting, pushing, or pulling the head unit 20. Further, since the grips 31, 32 are attached to the housing 21 with sufficient strength with the screws having the diameter of M4 or more, the possibility that the grips 31, 32 are detached from the housing 21 when the operator lifts, pushes, or pulls the head unit 20 is low. Accordingly, the possibility that the operator makes the print head 200 collide with the surrounding objects to be damaged when lifting, pushing, or pulling the head unit 20 is reduced.

Further, according to the liquid ejection apparatus 1 related to the present embodiment, the operator can press the head unit 20 into the carriage 50 with weak force by gripping the grip 32 to slide the roller 24 along the rail 53, and can therefore easily mount the head unit 20 on the carriage 50.

Further, according to the liquid ejection apparatus 1 related to the present embodiment, even when the position where the connector 60 provided to the surface 52*a* of the carriage 50 and the connector 30 provided to the surface 21*b* of the housing 21 of the head unit 20 are fitted to each other is shifted within a predetermined range, the coupling portion 62 of the connector 60 can move to fit to the connector 30. Further, the fitting portion 62*b* having the tapered shape provided to the coupling portion 62 of the connector 60 guides the engagement with the connector 30. Therefore, according to the liquid ejection apparatus 1 related to the present embodiment, it is easy to appropriately couple the connector 60 and the connector 30, and the possibility that the connector 60 or the connector 30 is damaged when fitting the connector 60 and the connector 30 to each other is reduced.

Further, according to the liquid ejection apparatus 1 related to the present embodiment, since the direction of the electrical coupling between the head unit 20 and the carriage 50 with the connectors 60, 30 and the direction of the mechanical coupling between the head unit 20 and the carriage 50 with the fixation mechanisms 55, 25 are orthogonal to each other, the stress applied to the connectors 60, 30 when fixing the head unit 20 is reduced, and the possibility that the connectors 60, 30 are damaged is reduced. Further, since the direction of inertial force caused by the movement of the carriage 50 is orthogonal to the direction of the electrical coupling between the head unit 20 and the carriage 50 and the direction of the mechanical coupling therebetween, the possibility that these couplings are released or destabilized by the inertial force is low. Therefore, the stability of both the electrical coupling and the mechanical coupling between the head unit 20 and the carriage 50 is improved.

Further, according to the liquid ejection apparatus 1 related to the present embodiment, since the handle 55*a* of the fixation mechanism 55 and the handle 25*a* of the fixation mechanism 25 are both located above the head unit 20, and the handle 55*a* located at the back side is higher in position than the handle 25*a* located at the front side when viewed from the operator, it is easy for the operator to operate the handles 55*a*, 25*a*, and the work of replacing the head unit 20 becomes easy.

According to the liquid ejection apparatus 1 related to the present embodiment, in the head unit 20, since the tube coupling section 23 is provided to the surface 21*a* provided with the grip 32, it is possible for the operator to manually couple the end of the ink tube to the tube coupling section 23 with ease in a state in which the connectors 60, 30 are fitted to each other, and the head unit 20 is fixed to the carriage 50 with the fixation mechanisms 55, 25.

7. Modified Examples

In the embodiment described above, in the housing 21 of the head unit 20, the surface 21*a* is provided with the tube coupling section 23 and the surface 21*b* is provided with the connector 30, but the surface 21*a* may be provided with the connector 30, and the surface 21*b* may be provided with the tube coupling section 23. In this case, a second tube coupling section to which the end of the ink tube is attached is provided to the surface 52*a* of the carriage 50, and the tube coupling section 23 provided to the surface 21*b* which is the back surface of the housing 21 is fitted to the second tube coupling section provided to the surface 52*a* of the carriage 50 by the operator gripping the grip 32 to press the head unit 20 into the carriage 50 along the rail 53. Meanwhile, the operator can manually fit the connector 60 coupled to the main board 100 with a wiring cable to the connector 30 provided to the surface 21*a* which is the front surface of the housing 21. Further, the connector 30 is provided to the surface 21*a* such that the shortest distance between the grip 32 provided on the surface 21*a* and the surface 21*c* of the housing 21 is shorter than the shortest distance between the connector 30 and the surface 21*c* and shorter than the shortest distance between the vent 42 and the surface 21*c*.

That is, since the grip 32 is disposed at the position closer to the surface 21*c* than the connector 30 and the vent 42 so that the coupling portion 32*c* extends along the X direction, it is easy for the operator to grasp the grip 31 and the grip 32 with both hands to lift the head unit 20, and to grasp the grip 32 to fine-tune the tilt of the head unit 20. Accordingly, the possibility that the operator makes the print heads 200 collide with the surrounding objects to be damaged when lifting, pushing, or pulling the head unit 20 is reduced.

The present disclosure includes substantially the same configurations such as configurations having the same functions, methods, and results, and configurations having the same purposes and advantages as the configuration described in the present embodiment. Further, the present disclosure includes configurations obtained by replacing non-essential portions of the configurations described in the present embodiment. Furthermore, the present disclosure includes configurations that exert the same functions and advantages or configurations that can achieve the same objects as those of the configurations described in the present embodiment. Further, the present disclosure includes configurations obtained by adding a known technique to the configuration described in the present embodiment.

The embodiment and the modified examples described above are illustrative only, and the present disclosure is not limited thereto. For example, the embodiment and the modified examples may appropriately be combined with each other.

The following contents is derived from the embodiment and the modified examples described above.

An aspect of a head unit is a head unit configured to eject a liquid to a medium, the head unit including a connector to which a power supply voltage propagates, a drive board including a drive signal generation circuit configured to generate a drive signal based on the power supply voltage, a fan configured to suction a gas from one of a first vent and a second vent and discharge the gas from another of the first vent and the second vent, a tube coupling section to be coupled to a tube configured to supply the liquid, a liquid ejection head including a piezoelectric element configured to eject the liquid by application of the drive signal, a housing which is configured to house the drive board and the fan and is provided with the first vent and the second vent, a first grip, and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the connector and the first vent are provided to the first surface, the tube coupling section is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the tube coupling section and the fourth surface, and shorter than a shortest distance between the second vent and the fourth surface.

According to this head unit, since the first grip is provided to the fourth surface opposite to the third surface provided with the liquid ejection head so that the first coupling portion extends along the second direction, it is easy for the operator to grasp the first grip to lift the head unit while keeping the head unit horizontal. Further, since the second grip is provided to the second surface crossing the third surface provided with the liquid ejection head, it is easy for the operator to grasp the second grip to push and pull the head unit. Further, since the second grip is disposed at a position closer to the fourth surface than the tube coupling section and the second vent so that the second coupling portion extends along the third direction, it is easy for the operator to grasp the first grip and the second grip with both hands to lift the head unit, and further, to grasp the second grip to fine-tune the tilt of the head unit. Therefore, according to this head unit, the possibility that the operator makes the liquid ejection head collide with the surrounding objects to be damaged when lifting, pushing, or pulling the head unit is reduced.

Further, according to this head unit, since the connector is provided to the first surface opposite to the second surface provided with the second grip, it is possible for the operator to grasp the second grip to press the head unit thereinto to thereby fit the connector to a connector as a coupling destination.

Further, according to this head unit, since the tube coupling section is provided to the second surface provided with the second grip, it is possible for the operator to manually couple a tube for supplying the liquid to the tube coupling section.

Another aspect of a head unit is a head unit configured to eject a liquid to a medium, the head unit including a connector to which a power supply voltage propagates, a drive board including a drive signal generation circuit configured to generate a drive signal based on the power supply voltage, a fan configured to suction a gas from one of a first vent and a second vent and discharge the gas from another of the first vent and the second vent, a tube coupling section to be coupled to a tube configured to supply the liquid, a liquid ejection head including a piezoelectric element configured to eject the liquid by application of the drive signal, a housing which is configured to house the drive board and the fan and is provided with the first vent and the second vent, a first grip, and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the tube coupling section and the first vent are provided to the first surface, the connector is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the connector and the fourth surface, and shorter than a shortest distance between the second vent and the fourth surface.

According to this head unit, since the first grip is provided to the fourth surface opposite to the third surface provided with the liquid ejection head so that the first coupling portion extends along the second direction, it is easy for the operator to grasp the first grip to lift the head unit while keeping the head unit horizontal. Further, since the second grip is provided to the second surface crossing the third surface provided with the liquid ejection head, it is easy for the operator to grasp the second grip to push and pull the head unit. Further, since the second grip is disposed at a position closer to the fourth surface than the connector and the second vent so that the second coupling portion extends along the third direction, it is easy for the operator to grasp the first grip and the second grip with both hands to lift the head unit, and further, to grasp the second grip to fine-tune the tilt of the head unit. Therefore, according to this head unit, the possibility that the operator makes the liquid ejection head collide with the surrounding objects to be damaged when lifting, pushing, or pulling the head unit is reduced.

Further, according to this head unit, since the tube coupling section is provided to the first surface opposite to the second surface provided with the second grip, it is possible for the operator to grasp the second grip to press the head unit thereinto to thereby fit the tube coupling section to a coupling section as a coupling destination.

Further, according to the head unit, since the connector is provided to the second surface provided with the second grip, it is possible for the operator to manually fit the connector to a connector as a coupling destination.

Further, according to this head unit, since the first vent and the second vent are respectively provided to the first surface and the second surface opposite to each other, the gas easily flows from one of the first vent and the second vent to the other thereof due to the airflow caused by the fan, and the drive board can efficiently be cooled.

In one aspect of the head unit, the housing may include a fifth surface crossing the second surface and the fourth surface, and a sixth surface opposite to the fifth surface, the first coupling portion may cross a first imaginary surface equidistant from the first surface and the second surface, and the second coupling portion may cross a second imaginary surface equidistant from the fifth surface and the sixth surface.

According to this head unit, it is easy for the operator to grasp the first grip to lift the head unit while keeping the head unit horizontal in the second direction which is the pushing and pulling direction, and to grasp the second grip to fine-tune the tilt while keeping the head unit horizontal in the third direction perpendicular to the pushing and pulling direction. Accordingly, the possibility that the operator makes the liquid ejection head collide with the surrounding objects to be damaged when lifting, pushing, or pulling the head unit is reduced.

In one aspect of the head unit, when viewed from the first direction, the first grip and the second grip may be shifted from each other.

According to this head unit, since the first grip provided to the fourth surface does not protrude to the second surface side, it is easy for the operator to grasp the first grip to horizontally lift the head unit.

In one aspect of the head unit, when viewed from the second direction, the first grip and the second grip may be shifted from each other.

According to this head unit, since the second grip provided to the second surface does not protrude to the fourth surface side, when the operator grasps the second grip to push or pull the head unit, the force is efficiently transmitted to the second surface.

In one aspect of the head unit, a length of the second coupling portion may be 5 cm or longer.

According to this head unit, since the operator can grasp the second grip with three or more fingers, even when the head unit is heavy in weight, it is easy to tilt, push, and pull the head unit.

In one aspect of the head unit, a weight of the head unit may be 5 kg or heavier.

According to this head unit, it is possible for the operator to grasp at least one of the first grip and the second grip to lift, push, and pull the head unit as heavy as 5 kg or more.

In one aspect of the head unit, the housing may be made from metal.

According to this head unit, since the housing is made from metal and is therefore high in strength, the possibility that the housing is damaged by the stress applied when lifting, pushing, or pulling the head unit is reduced.

In one aspect of the head unit, the first grip and the second grip may be made from metal.

According to this head unit, since the first grip and the second grip are made from metal, and are therefore high in strength, a deformation and breakage of the first grip and the second grip less likely occur when lifting, pushing, or pulling the head unit. Accordingly, the possibility that the operator makes the liquid ejection head collide with the surrounding objects to be damaged when lifting, pushing, or pulling the head unit is reduced.

In one aspect of the head unit, each of the first grip and the second grip may be attached to the housing with a screw having a diameter of M4 or more.

According to this head unit, the first grip and the second grip are attached to the housing with sufficient strength with the screw having a diameter of M4 or more. Accordingly, the possibility that the first grip or the second grip are detached from the housing to make the liquid ejection head collide with the surrounding objects to be damaged when the operator lifts, pushes, or pulls the head unit is reduced.

In one aspect of the head unit, when viewed from the second direction, at least a part of the first vent and at least a part of the second vent may overlap each other.

According to this head unit, since the gas flows from one of the first vent and the second vent to the other thereof without stagnating due to the airflow caused by the fan, the heat dissipation effect is enhanced, and the drive board can efficiently be cooled.

An aspect of a liquid ejection apparatus includes the head unit.

What is claimed is:

1. A head unit configured to eject a liquid to a medium, comprising:

a connector to which a power supply voltage propagates;

a drive board including a drive signal generation circuit configured to generate a drive signal based on the power supply voltage;

a fan configured to suction a gas from one of a first vent and a second vent and discharge the gas from another of the first vent and the second vent;

a tube coupling section to be coupled to a tube configured to supply the liquid;

a liquid ejection head including a piezoelectric element configured to eject the liquid by application of the drive signal;

a housing which is configured to house the drive board and the fan and is provided with the first vent and the second vent;

a first grip; and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the connector and the first vent are provided to the first surface, the tube coupling section is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the tube coupling section and the fourth surface, and shorter than a shortest distance between the second vent and the fourth surface.

2. A head unit configured to eject a liquid to a medium, comprising:

a connector to which a power supply voltage propagates;

a drive board including a drive signal generation circuit configured to generate a drive signal based on the power supply voltage;

a fan configured to suction a gas from one of a first vent and a second vent and discharge the gas from another of the first vent and the second vent;

a tube coupling section to be coupled to a tube configured to supply the liquid;

a liquid ejection head including a piezoelectric element configured to eject the liquid by application of the drive signal;

a housing which is configured to house the drive board and the fan and is provided with the first vent and the second vent;

a first grip; and a second grip, wherein the first grip includes a first support portion, a second support portion, and a first coupling portion configured to couple the first support portion and the second support portion to each other, the second grip includes a third support portion, a fourth support portion, and a second coupling portion configured to couple the third support portion and the fourth support portion to each other, the housing includes a first surface, a second surface opposite to the first surface, a third surface crossing the first surface and the second surface, and a fourth surface opposite to the third surface, when defining a normal direction of the third surface as a first direction, a normal direction of the second surface as a second direction, and a direction orthogonal to the first direction and the second direction as a third direction, the tube coupling section and the first vent are provided to the first surface, the connector is provided to the second surface, the second grip is provided to the second surface so that the second coupling portion extends along the third direction, the liquid ejection is provided to the the third surface, the first grip is provided to the fourth surface so that the first coupling portion extends along the second direction, the second vent is disposed at a position visible when viewing the second surface from the second direction, a shortest distance between the second grip and the fourth surface is shorter than a shortest distance between the connector and the fourth surface, and shorter than a shortest distance between the second vent and the fourth surface.

3. The head unit according to claim 1, wherein the housing includes a fifth surface crossing the second surface and the fourth surface, and a sixth surface opposite to the fifth surface, the first coupling portion crosses a first imaginary surface equidistant from the first surface and the second surface, and the second coupling portion crosses a second imaginary surface equidistant from the fifth surface and the sixth surface.

4. The head unit according to claim 1, wherein when viewed from the first direction, the first grip and the second grip are shifted from each other.

5. The head unit according to claim 1, wherein when viewed from the second direction, the first grip and the second grip are shifted from each other.

6. The head unit according to claim 1, wherein a length of the second coupling portion is 5 cm or longer.

7. The head unit according to claim 1, wherein a weight of the head unit is 5 kg or more.

8. The head unit according to claim 1, wherein the housing is made from metal.

9. The head unit according to claim 1, wherein the first grip and the second grip are made from metal.

10. The head unit according to claim 1, wherein each of the first grip and the second grip is attached to the housing with a screw having a diameter of M4 or more.

11. The head unit according to claim 1, wherein when viewed from the second direction, at least a part of the first vent and at least a part of the second vent overlap each other.

12. A liquid ejection apparatus comprising:

the head unit according to claim 1.

13. The head unit according to claim 2, wherein the housing includes a fifth surface crossing the second surface and the fourth surface, and a sixth surface opposite to the fifth surface, the first coupling portion crosses a first imaginary surface equidistant from the first surface and the second surface, and the second coupling portion crosses a second imaginary surface equidistant from the fifth surface and the sixth surface.

14. The head unit according to claim 2, wherein when viewed from the first direction, the first grip and the second grip are shifted from each other.

15. The head unit according to claim 2, wherein when viewed from the second direction, the first grip and the second grip are shifted from each other.

16. The head unit according to claim 2, wherein a length of the second coupling portion is 5 cm or longer.

17. The head unit according to claim 2, wherein the first grip and the second grip are made from metal.

18. The head unit according to claim 2, wherein each of the first grip and the second grip is attached to the housing with a screw having a diameter of M4 or more.

19. The head unit according to claim 2, wherein when viewed from the second direction, at least a part of the first vent and at least a part of the second vent overlap each other.

20. A liquid ejection apparatus comprising:

the head unit according to claim 2.

* * * * *